United States Patent [19]

Sallas et al.

[11] Patent Number: 5,719,821
[45] Date of Patent: Feb. 17, 1998

[54] METHOD AND APPARATUS FOR SOURCE SEPARATION OF SEISMIC VIBRATORY SIGNALS

[75] Inventors: John J. Sallas; Dennis Corrigan, both of Plano, Tex.

[73] Assignee: Atlantic Richfield Company, Los Angeles, Calif.

[21] Appl. No.: 556,302

[22] Filed: Sep. 29, 1995

[51] Int. Cl.$^6$ .................................................. G01V 1/28
[52] U.S. Cl. ........................... 367/41; 367/38; 364/421
[58] Field of Search ............................ 364/421; 367/38, 367/41, 42; 181/111, 112

[56] References Cited

U.S. PATENT DOCUMENTS

| | | | |
|---|---|---|---|
| 3,332,511 | 7/1967 | Silverman | 181/5 |
| 3,885,225 | 5/1975 | Anstey et al. | 367/41 |
| 4,159,463 | 6/1979 | Silverman | 340/15.5 |
| 4,545,039 | 10/1985 | Savit | 367/39 |
| 4,646,274 | 2/1987 | Martinez | 367/41 |
| 4,707,812 | 11/1987 | Martinez | 367/46 |
| 4,715,020 | 12/1987 | Landrum, Jr. | 367/48 |
| 4,823,326 | 4/1989 | Ward | 367/41 |
| 4,982,374 | 1/1991 | Edington et al. | 367/48 |
| 5,000,285 | 3/1991 | Airhart | 181/113 |

OTHER PUBLICATIONS

Robinson, "Predictive Decomposition of Seismic Traces", *Geophysics*, vol. XXII, No. 4 (Oct., 1957), pp. 767–778.
Peacock and Treitel,"Predictive Deconvolution: Theory and Practice", *Geophysics*, vol. XXXIV, No. 2 (Apr., 1969), pp. 155–169.
Servodio and Bertelli, "Dual Source VIBROSEIS Acquisition for 2D Survey by Using Conventional and E–Code Sweeps", presented at the *56th Meeting and Exposition of the European Association of Exploration Geophysicists*, (Jun., 1994).

*Primary Examiner*—Ian J. Lobo
*Attorney, Agent, or Firm*—Anderson, Levine & Lintel

[57] ABSTRACT

A method of separating the effects of the earth response on vibratory energy from individual ones of multiple vibrators to geophones, in generating a seismic survey, is disclosed. According to the disclosed method, measurements of the actual vibrations generated at the source are made, in addition to the geophone measurements of the refracted and reflected vibrations, both over a number of frequency sweeps. The source and geophone vibrations are first transformed into frequency domain representations, by way of Discrete Fourier Transforms. An inverse matrix of the recorded frequency-domain source vibrations is then generated for each frequency. When the number of sweeps equals the number of vibrators, the inverse matrix is merely the multiplicative inverse of the source measurements; if the number of sweeps exceeds the number of vibrators, the inverse matrix is the generalized inverse of the original matrix. The inverse matrix for the frequency is applied to the recorded geophone vibrations at that frequency, to derive the transfer function, corresponding to the earth response, for each vibrator-geophone path in the survey. A weighting factor may be used to discount the effects of poorly behaved sweeps, and may be based on the ratio of the maximum and minimum eigenvalues for the inverse matrix.

28 Claims, 10 Drawing Sheets

METHOD AND APPARATUS FOR SOURCE SEPARATION OF SEISMIC VIBRATORY SIGNALS

This invention is in the field of geological exploration, and is more particularly directed to analysis of recorded vibration signals in a seismic survey.

BACKGROUND OF THE INVENTION

As is well known in the field of oil and gas exploration, seismic surveys of the earth are often performed to determine if hydrocarbon reservoirs may be located under the survey area. In the general sense, conventional seismic surveys involve the imparting of acoustic or vibratory energy having known attributes at one or more locations of the earth, and the detecting of this energy at locations of the earth spaced away from the locations at which the energy is imparted. The imparted energy travels in the earth from the source location, and is refracted by subsurface strata and reflected from interfaces between strata. Measurement of the time required for the energy to travel from source to receiver is indicative of the length of the path traveled by the energy, from which the depth of various geological formations may be deduced.

As is also known in the art, various types of seismic source energy and source equipment are commonly used. An important type of land-based seismic survey uses seismic vibrator sources. In these surveys, a number of vibrators are placed at desired locations in the survey region, and simultaneously impart strong vibrations into the earth. Typically, the vibrator is generally a large truck or other vehicle that has a base plate in contact with the earth. A hydraulic jack and a heavy (e.g., on the order of two tons) reaction mass cooperate in each vibrator to impart vibrations into the earth via the base plate, for detection by geophones in an array that is some distance from the array of vibrators. An example of a conventional truck-mounted seismic vibrator is described in U.S. Pat. No. 5,000,285, issued Mar. 19, 1991, assigned to Atlantic Richfield Company and incorporated herein by this reference. As is also well known in the art, the vibratory energy imparted into the earth for such surveys is generally of varying frequency to enable determination of the travel time from source to detector. Typically, the vibration varies linearly over time between a lower limit (e.g., 5 Hz) and an upper limit (e.g., 150 Hz), either with a fixed amplitude or using a frequency-dependent amplitude "envelope". Each sequence of imparting energy according to such varying frequency is generally referred to as a "sweep" or "chirp".

As is also well known in the art, seismic surveys are expensive undertakings, with the expense most directly related to the time required to impart and record the vibratory energy. As such, many modern vibratory seismic surveys are performed by simultaneously imparting energy into the earth from multiple source locations, such that each geophone will detect the composite of the refracted and reflected energy from the multiple sources. The detected composite energy is then recorded, at a recording station located in the survey area, over a time window to provide a seismic record of the sweep for each geophone location. In such surveys where multiple sources are simultaneously operated, processing of the seismic records from the geophones must separate the detected energy from each of the multiple sources in order to provide information regarding the subsurface path of the energy from each source to the geophone location.

Separation of the composite record according to source is conventionally facilitated by coding the source energy in such a way that the contributions of each of the multiple sources can be readily determined from the composite record. An example of such coding is referred to as 0°–180° coding, and is described in U.S. Pat. No. 4,159,463. In this example, two vibratory sources are twice simultaneously operated, to impart two sweeps of vibrations into the earth. In the second sweep, each of the two sources imparts identical energy as in the first sweep, except that the energy from the first source is 180° out of phase relative to the first sweep. Addition of the two records from the two sweeps will isolate the contribution of the second source (the 180° phase difference cancelling the first source contribution); shifting of one of the records by 180° followed by addition of the two records will then isolate the first source contribution. A more general approach to phase encoding for multiple vibratory sources of number greater than two is described in U.S. Pat. No. 4,715,020; according to this approach, the number of sweeps again equals the number of simultaneously operated vibrators.

According to another known phase encoding scheme, the phase shift of each source in a given sweep is selected so that isolation of the contribution from each source may be done by phase-shifting and summing the records from the multiple sweeps. According to this example, the phase shifts for four vibrations A, B, C, D over sweeps 1 through 4 (such phase shifts in degrees, and relative to the phase of vibrator A in the first sweep), are according to the following table:

|         | Vibrator | | | |
|---------|---|---|---|---|
|         | A | B | C | D |
| Sweep 1 | 0 | 90 | 90 | 180 |
| Sweep 2 | 90 | 0 | 180 | 90 |
| Sweep 3 | 90 | 180 | 0 | 90 |
| Sweep 4 | 180 | 90 | 90 | 0 |

According to this approach, isolation of the contribution from vibrator A is obtained by shifting the record of sweep 2 by −90°, shifting the record of sweep 3 by −90°, shifting the record of sweep 4 by 180°, and by adding the four records together; in this case, the summed record will be four times the record from vibrator A, with all of the other contributions cancelling out one another. Similarly, to resolve vibrator B, the records from sweeps 1 and 4 will be phase shifted by −90° and the record from sweep 3 will be phase shifted by 180° prior to summing. The other sources' contributions are similarly determined by a combination of phase shifts and addition, thus isolating the contributions from each of the four vibration sources.

By way of further background, U.S. Pat. No. 4,545,039 describes a vibratory seismic survey technique utilizing a pseudo-randomized selection of the vibration pulses. According to this approach, in which different uncorrelated sweeps are generated by each vibrator, each record is correlated multiple times (once for each vibrator/code employed), after which the separated records corresponding to each vibrator are stacked, in order to separate the contribution of each source to the record.

According to each of these techniques, identification of the travel time from source to geophone is made by determining the time at which the source vibration appears in the seismic record. This determination is made by examining the as-detected seismic record to recognize the attributes of the frequency-variant source vibration therewithin. This recognition may be done in an automated fashion by cross-correlation, in the time domain, of the source vibration waveform with the detected vibrations at the geophone (after separation); a maximum in the amplitude of the correlogram (indicative of the maximum correlation of the source and receiver vibrations) occurs at a correlation time lag corresponding to the travel time of the vibrations. This correlation may also be performed in the frequency domain after performing Fourier transform operations on the source and detected vibrations. In the frequency domain, the complex conjugate of the source spectrum is multiplied by the frequency domain representation of the detected vibrations, and an inverse transform of this product produces the time domain correlation output.

By way of further background, U.S. Pat. No. 3,332,511 describes a method and system for obtaining vibratory seismic surveys, where the source signal used in the correlation operation is obtained by measuring the imparted source vibrations at an earth location near the vibrators. However, conventional techniques for performing the correlation of the source energy to the detected seismic record generally use an idealized representation of the source energy waveform (i.e., the "pilot" signal) as the correlation operator, instead of using measurements of the vibrations actually generated by the vibrators in the correlation. This is because the actual vibrations (and thus the measurements) are generally rich in harmonics, resulting in sidelobe artifacts on both sides of the main lobe of the correlation result; these sidelobe artifacts greatly cloud the correlation result, and thus adversely affect the accuracy of the resulting survey. Accordingly, the use of actual vibrator measurements as the correlation operator in a vibratory seismic survey is discouraged in the prior art.

In addition to the harmonics noted above, it has also been observed that the actual source energy waveform is otherwise distorted from the ideal input wave by non-linearities in the mechanical hydraulic system for generating the vibrations, by non-linearities in the coupling of the vibration system to the earth, by flexure of the base plate of the vibrator system, and by other non-linear factors. These distortions in the source energy as actually imparted to the earth, relative to the pilot signal, greatly increases the difficulty of accurately determining the transit time of the energy from source to receiver by conventional correlation techniques. Further increasing this difficulty is the frequency-dependent behavior of some of the non-linearities, such that the correlation between detected seismic record and pilot waveform is poorer at certain frequencies. This inaccuracy in the correlation results is especially troublesome where multiple sources are simultaneously energized in a vibratory seismic survey, considering that each detected seismic record includes energy from sources other than the source of interest.

By way of further background, it has been observed that the operation of vibration sources in a seismic survey is often non-repeatable. For example, one of the multiple vibration sources may not actuate during a given sweep, or may actuate with a large amount of noise. If detected in the field at the time of the sweep, such failures may require the re-running of a sweep; however, if undetected in the field during the survey, such events may contaminate the seismic record for that sweep, reducing the amount of data obtained in the survey accordingly.

Even where correlation relative to multiple sources is performed according to these conventional techniques, the resolution of the survey is generally limited to a treatment of the multiple vibration sources as a single source. As such, the S spatial resolution is generally quite coarse, and cannot provide high-resolution delineation of the subsurface geology.

By way of further background, U.S. Pat. No. 4,646,274, issued Feb. 24, 1987, and assigned to Atlantic Richfield Company, describes the use of actual measurements of the ground force imparted by vibratory seismic sources in development of an inverse filter for correction of phase distortion.

It is an object of the present invention to provide an improved method for analyzing vibratory seismic records to account for non-linear and frequency-dependent effects.

It is a further object of the present invention to provide such a method that is able to account for sweeps in which one of the vibratory sources has failed or is noisy.

It is a further object of the present invention to provide such a method that is able to process vibratory seismic records containing harmonic effects arising from multiple simultaneously activated vibratory sources.

It is a further object of the present invention to provide such a method in which the resolution of the survey is improved so as to individually treat the vibratory sources, rather than limit the resolution to the vibratory source array.

Other objects and advantages of the present invention will be apparent to those of ordinary skill in the art having reference to the following specification together with the drawings.

SUMMARY OF THE INVENTION

The invention may be incorporated into a method and system for performing a vibratory seismic survey, where multiple vibratory sources are activated simultaneously. Multiple sweeps are performed using these multiple sources, according to a selected encoding scheme among the sources and the sweeps. The source vibrations are measured both at the vibrators, and also at locations spaced away therefrom after reflection and refraction of the vibrations by geological structures and interfaces. For each sweep, each geophone produces a record that is the composite of the source vibrations as reflected and refracted by the path between each source and the geophone. According to the present invention, the seismic records are analyzed in the frequency domain by generating an inverse matrix operator, at each frequency of interest, that is based upon the actual measured source vibrations at the vibrators. The inverse matrix operator is applied to each record at that frequency, resulting in a transfer function for each source-geophone path at that frequency; the process is then repeated for each of the frequencies of interest in the record. The present method produces a transfer function for each geophone location for each vibration source, separating the path of energy from each source from the others in the array. The transfer function represents the response of the earth, over the source-geophone path, to the source vibrations. The method readily accounts for non-linearities and harmonic distortion between the desired source waveform and the actual source vibrations, and can account for sweeps in which one of the vibrators is noisy or absent. According to an alternative embodiment of the invention, one of the sources is turned off in each sweep, facilitating separation. According to another alternative embodiment of the invention, a measurement of the behavior of the sweep may be used to reduce or eliminate the contribution of poorly-behaved sweeps in the survey. According to another embodiment of the invention, more sweeps than the number of vibrator sources are performed, to provide a more robust solution in determining the response of the earth to the source vibrations.

DETAILED DESCRIPTION OF THE PREFERRED EMBODIMENT

Figure 1:
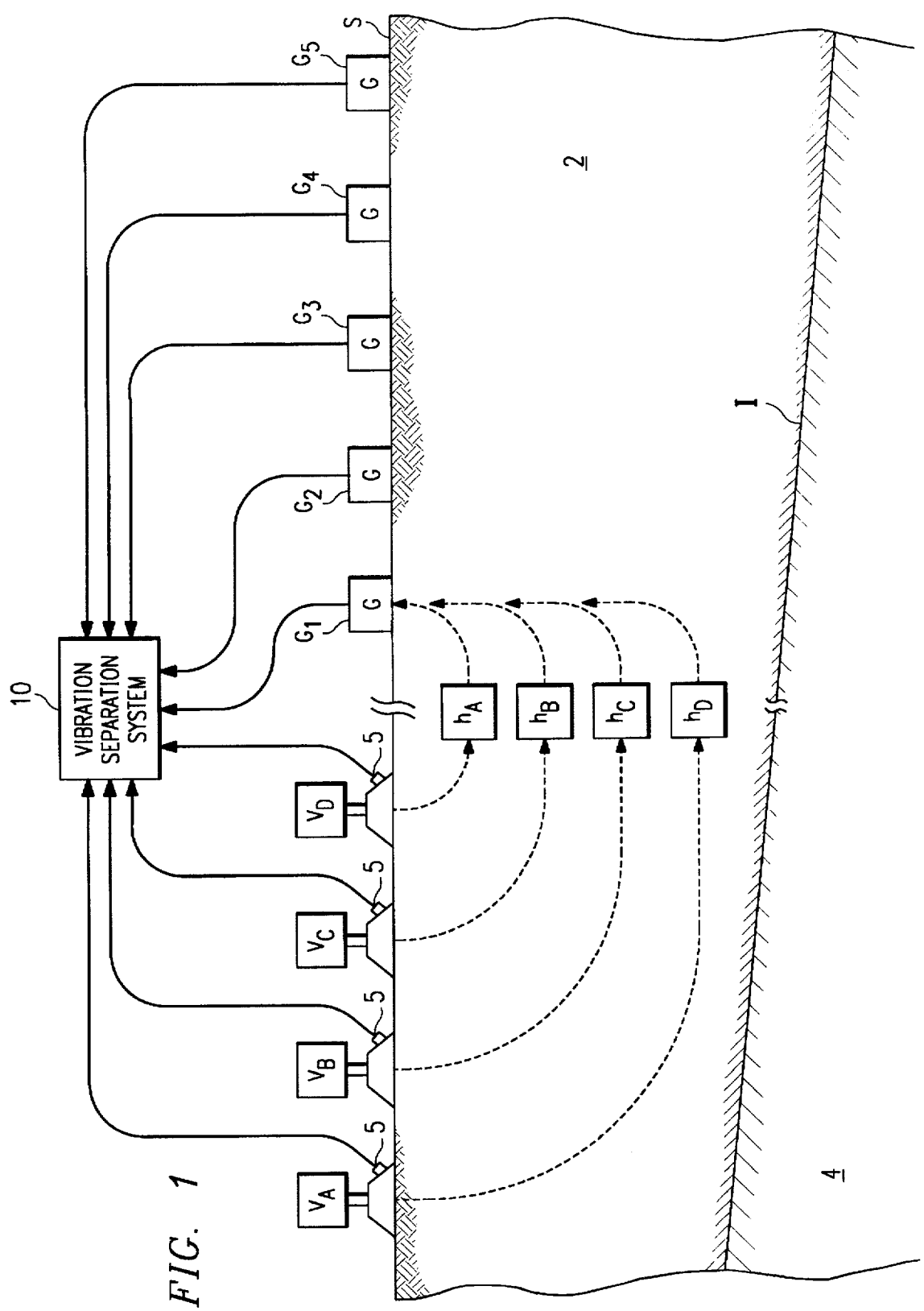
FIG. 1 is a schematic illustration of a cross-section of the earth at which a vibratory seismic survey according to the preferred embodiment of the invention is performed.

Referring first to FIG. 1, a cross-section of the earth is illustrated, at which a two-dimensional (2-D) vibratory seismic survey according to the preferred embodiment of the invention is being performed. While the following description will be directed to a land-based survey of the earth, it will of course be understood that the present invention is also applicable to marine seismic surveys.

In the exemplary survey of FIG. 1, four vibrators $V_A$ through $V_D$ are in place at surface S of the earth. Vibrators V are conventional vibratory sources, such as of the truck-mounted type. Examples of conventional vibrators V include those described in U.S. Pat. No. 5,000,285, issued Mar. 19, 1991, assigned to Atlantic Richfield Company and incorporated herein by reference; other conventional vibrators useful in the performance of vibratory seismic surveys may alternatively be used. In addition, other types of actuators for generating seismic energy in a coded fashion may also be utilized in place of vibrators V. In this exemplary survey, vibrators $V_A$ through $V_D$ are disposed near one another, but are spaced apart by a small distance. The distance between adjacent vibrators V will depend upon the survey design, but is typically on the order of 40 feet. Furthermore, in the 2-D exemplary survey shown in FIG. 1, vibrators $V_A$ through $V_D$ are shown as collinear with one another. For purposes of 3-D surveying, vibrators V may be placed in the survey region in a non-collinear fashion. Furthermore, either in 2-D or 3-D surveys, after the desired number of sweeps are performed for vibrators V in the position illustrated in FIG. 1, vibrators V will be moved to a different location of the survey region and energized in a similar fashion.

In this embodiment of the invention, sensors 5 are attached to each of vibrators V, and are connected to vibration separation system 10; sensors 5 detect the motion or force of vibrators V, and generate a signal to vibration separation system 10 corresponding to the actual source energy imparted to the earth by its associated vibrator V. Each sensor 5 may be an accelerometer mounted to the reaction mass or the base plate of a vibrator V or to the surface of the earth immediately adjacent thereto, a transducer for measuring the differential pressure in the actuation chamber of a vibrator V, a load cell attached to the base plate of a vibrator V, or other conventional transducer for measuring the actual output of vibrator V. The measurements made by sensors 5 are typically minimum phase relatives of the actual vibrations, and are thus representative of the actual source vibrations imparted into the earth by their associated vibrators V.

As is also shown in the survey of FIG. 1, geophones $G_1$ through $G_5$ are disposed at surface S of the earth in the survey region at a location that is spaced apart from vibrators V. Geophones G are of conventional construction, as currently used in conventional vibratory seismic surveys; alternatively, depending of course on the particular survey location (land or marine) and energy type, other conventional detectors may be used in lieu of geophones G. In addition, many more than five geophones G are typically used in a vibratory seismic survey; the five geophones G of FIG. 1 are merely shown for simplicity. In addition, while geophones G are shown as collinear with one another, geophones G may be arranged in a non-collinear arrangement, or may be arranged in an array of rows and columns of geophones, depending upon the survey design and desired results. The spacing between geophones G may be quite small, such as on the order of 15 to 40 feet. The distance between the group of vibrators V and geophones G will vary according to the particular survey, and according to the rolling of vibrators V through the survey region. Indeed, in some surveys where geophones G are arranged in an array, vibrators V may actually be within the area of the geophone array at some times in the survey.

As shown in FIG. 1, vibratory energy travels from each of vibrators V to geophones G in the survey area. The vibrations actually received by each geophone G will depend upon the input vibratory signal presented by each of vibrators V, as affected by a transfer function h corresponding to the geological nature of the vibration path between vibrator V and geophone G. This transfer function h will be determined by both refraction and reflection of the vibratory energy by geological structures. For the example of geophone $G_1$, as shown in FIG. 1, separate transfer functions $h_A$ through $h_D$ are presented by the earth, corresponding to the four different paths between vibrators $V_A$ through $V_D$, on the one hand, and geophone $G_1$, on the other hand. Transfer function $h_A$ thus corresponds to the response of the earth along the path between vibrator $V_A$ and geophone $G_1$, which includes the effects of refraction within upper layers of the earth (e.g., layer 2) and reflection at interfaces between subsurface layers (e.g., at interface I between layers 2, 4). These two physical effects of the earth cause the vibratory energy as received at the geophone $G_1$ to be delayed and modified from that imparted to the earth at vibrator $V_A$. Transfer function $h_A$ thus corresponds to the function that will generate the signal recorded from geophone $G_1$ when convolved with the source vibration waveform (in the time domain), or when multiplied with the source vibration spectrum (in the frequency domain), as is well known in the art.

In addition to these reflection and refraction effects imparted by the earth upon the source vibrations, transfer functions h will also include the effects of dynamics of the corresponding vibrator V that are present between the monitoring point (i.e., the location at which sensor 5 is placed on a particular vibrator V) and the earth surface. For example, if sensor 5 is implemented as a transducer for measuring the differential pressure in the actuation chamber of vibrator $V_A$, transfer function $h_A$ will also include effects corresponding to inaccuracies in the measurement of the source vibrations via monitoring of the differential pressure. Because these dynamics are generally minimum phase effects, however, subsequent filtering and processing can readily remove these inaccuracies, as will be noted below.

As will be described in detail hereinbelow, the use of multiple sweeps simultaneously in the vibratory survey provides a reduction in the time required for the survey, but results in each of geophones G recording a composite seismic record based upon the vibratory energy supplied by each of vibrators V, for each of the sweeps performed. The seismic records recorded by geophones G are stored at vibration separation system 10, and analyzed thereby.

Figure 2:
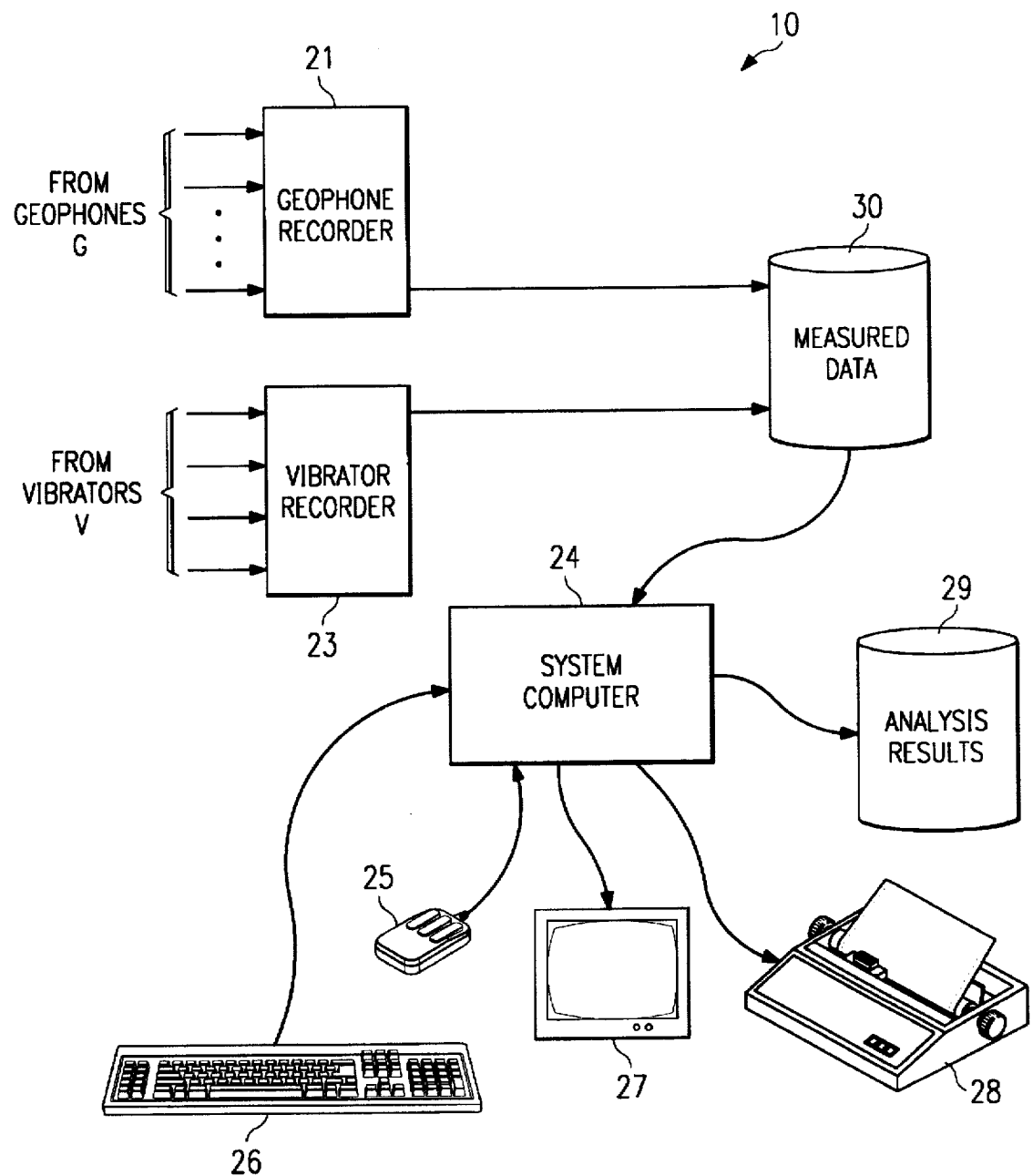
FIG. 2 is a schematic illustration of a computer system suitable for performing the method according to the preferred embodiment of the invention.

Referring now to FIG. 2, vibration separation system 10 according to the preferred embodiment of the invention, for analyzing the recorded seismic vibrations from vibrators V and geophones G to separate the contribution of each vibrator V to the recorded seismic signals from each geophone G. As shown in FIG. 2, the system of the preferred embodiment of the invention includes vibration separation system computer 24. System computer 24 may be implemented by any conventional personal computer or workstation, preferably an UNIX-based workstation such as a SPARCstation available from Sun Microsystems, Inc., and may be implemented either in standalone fashion, or as part of a network arrangement. According to the preferred embodiment of the invention, system computer 24 presents output primarily onto graphics display 27, or alternatively via printer 28; further in the alternative, system computer 24 may store the results of the analysis described hereinbelow on disk storage 29, for later use and further analysis. Keyboard 26 and pointing device (e.g., a mouse, trackball, or the like) 25 are provided with system computer 24 to enable interactive operation. System computer 24 is able to communicate with disk storage devices, including external hard disk storage on a network and floppy disk drives. It is contemplated that vibration separation system 10, as shown in FIG. 2, may either be located at a data center remote from the survey region, or alternatively (and preferably) is located on site at the survey to provide real-time analysis of the survey results.

As shown in FIG. 2, recording units 21, 23 are provided to record vibration signals from the survey. In this example, recording unit 21 receives electrical time domain signals from accelerometers on vibrators V, while recording unit 23 receives electrical time domain signals from geophones G. Recording units 21, 23 are in communication with disk storage 30 (or via system computer 24, if desired), and convert the electrical signals from vibrators V and geophones G into digital data for storage on disk storage 30. As such, recording units 21, 23 are of conventional construction as is known in the art. In this embodiment of the invention, system computer 24 is able to retrieve the stored data, representative of the detected vibrations, from one or more disk storage device 30. While FIG. 2 illustrates disk storage 30 as directly connected to system computer 24, it is also contemplated that disk storage device 30 may be accessible through a local area network or by remote access. Furthermore, while disk storage devices 29, 30, are illustrated as separate devices, a single disk storage device may of course be used to store any and all of the measurement data, as appropriate.

Figure 3:
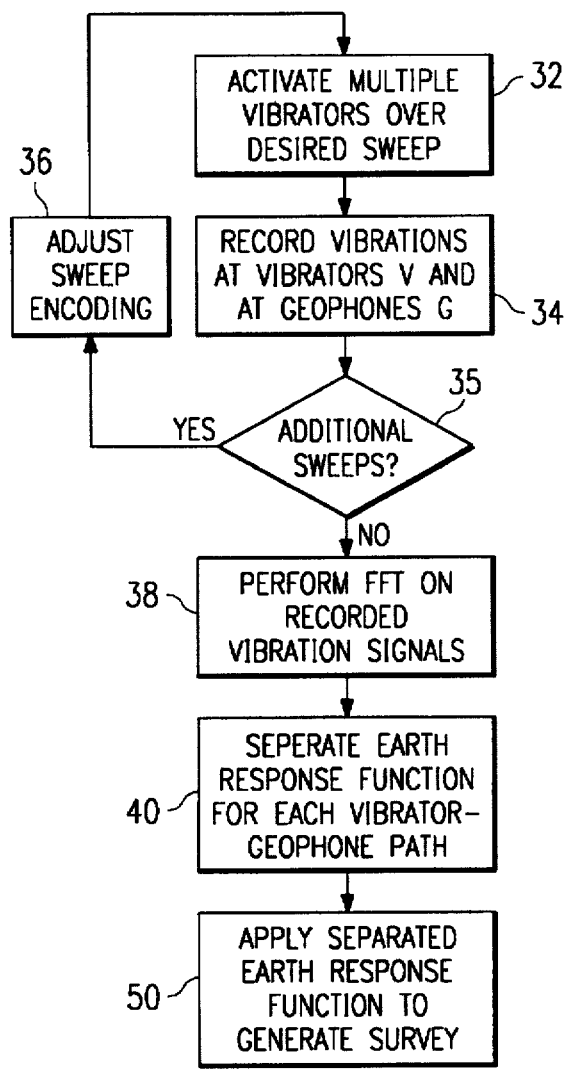
FIG. 3 is a flow chart illustrating a method of performing a vibratory seismic survey according to the preferred embodiment of the invention.

Referring now to FIG. 3 in combination with FIGS. 1 and 2, the method of performing a vibratory seismic survey and analyzing the results thereof, according to the preferred embodiment of the invention, will now be described in detail. The method of FIG. 3 will be described for a single placement of vibrators V and geophones G as in FIG. 1; it will be understood, of course, that the method described relative to FIG. 3 will generally be repetitively applied and performed for multiple placements of vibrators V relative to geophones G over the entire survey area. As such, the data processing portions of the method of FIG. 3 may be performed either in real-time (i.e., with each placement's information processed prior to performing the survey from the next position) or as a subsequent batch processing operation upon completion of the data acquisition over the entire survey area.

According to the preferred embodiment of the invention, process 32 initiates the survey through simultaneous activation of vibrators V to perform a first sweep, in which each vibrator V vibrates the earth over a range of frequency. The particular frequency operation of vibrators V over the sweep may be according to any of the known techniques, depending upon the type of survey desired. Typically, a frequency upsweep or downsweep will produce a vibration waveform V(t), in the linear case, as follows:

$$V(t) = A(t)\sin\left(2\pi\left(\frac{SRt^2}{2} + f_0 t\right) + \phi\right)$$

where SR is the sweep rate of frequency from the initial frequency over time (positive SR being an upsweep, and negative SR being a downsweep), and where A(t) is an amplitude envelope function for the vibrations (typically a constant). The phase angle $\phi$ corresponds to the phase encoding of the vibrations, as described above, for purposes of separation of the contributions of the vibrations from specific ones of vibrators V. Of course, nonlinear sweeps (i.e., where the frequency of the source vibration is not linear over time) may also be used in generating the survey. Alternatively, a pseudo-random frequency sweep (i.e., where the instantaneous frequency of vibrations from each vibrator V varies in a pseudo-random manner) may be used, particularly for surveys in urban and suburban areas where damage to nearby structures can be caused by resonant vibrations.

Process 32 thus activates the vibrators V for a sweep according to the desired approach, in the conventional manner. In process 34, vibrations are recorded in the time domain both by sensors 5 at vibrators V, and also from each of the geophones G in the survey. Recording units 21, 23 transmit the recorded vibration signals to disk storage 30 in vibration separation system 10 at the appropriate time (either prior to the next sweep or after all sweeps are completed), to complete process 34. As is well known in the art, the stored vibration signals will thus be a sequence of digital sampled values of the analog vibrations in the time domain as received by sensors 5 and geophones G.

Decision 35 is then performed to determine if additional sweeps are to be performed at the particular positioning of vibrators V versus geophones G in the survey, in which case the sweep encoding is adjusted in process 36 for the next sweep, in the conventional manner. Processes 32, 34 are then repeated for the remaining sweeps. According to a first embodiment of the invention, the number of sweeps performed (i.e., the number of passes through processes 32, 34) is equal to the number of vibrators V in the survey. For the example of FIG. 1, where four vibrators $V_A$ through $V_D$ are used, four sweeps are performed.

Upon completion of the desired number of sweeps, vibration separation system 10, specifically system computer 24, performs a Fourier transform of the recorded vibration signals in process 38, upon both the signals recorded by vibrators V and also the signals recorded by geophones G to convert the stored time-domain representations into digital frequency-domain representations. The Fourier transform techniques used in process 38 are conventional in the art, and are commonly referred to as Discrete Fourier Transforms (DFTs) or Fast Fourier Transforms (FFTs). The result of process 38 is then stored in the memory of vibration separation system 10, either in random access memory of system computer 24 or in disk storage 30.

Figures 8, 10:
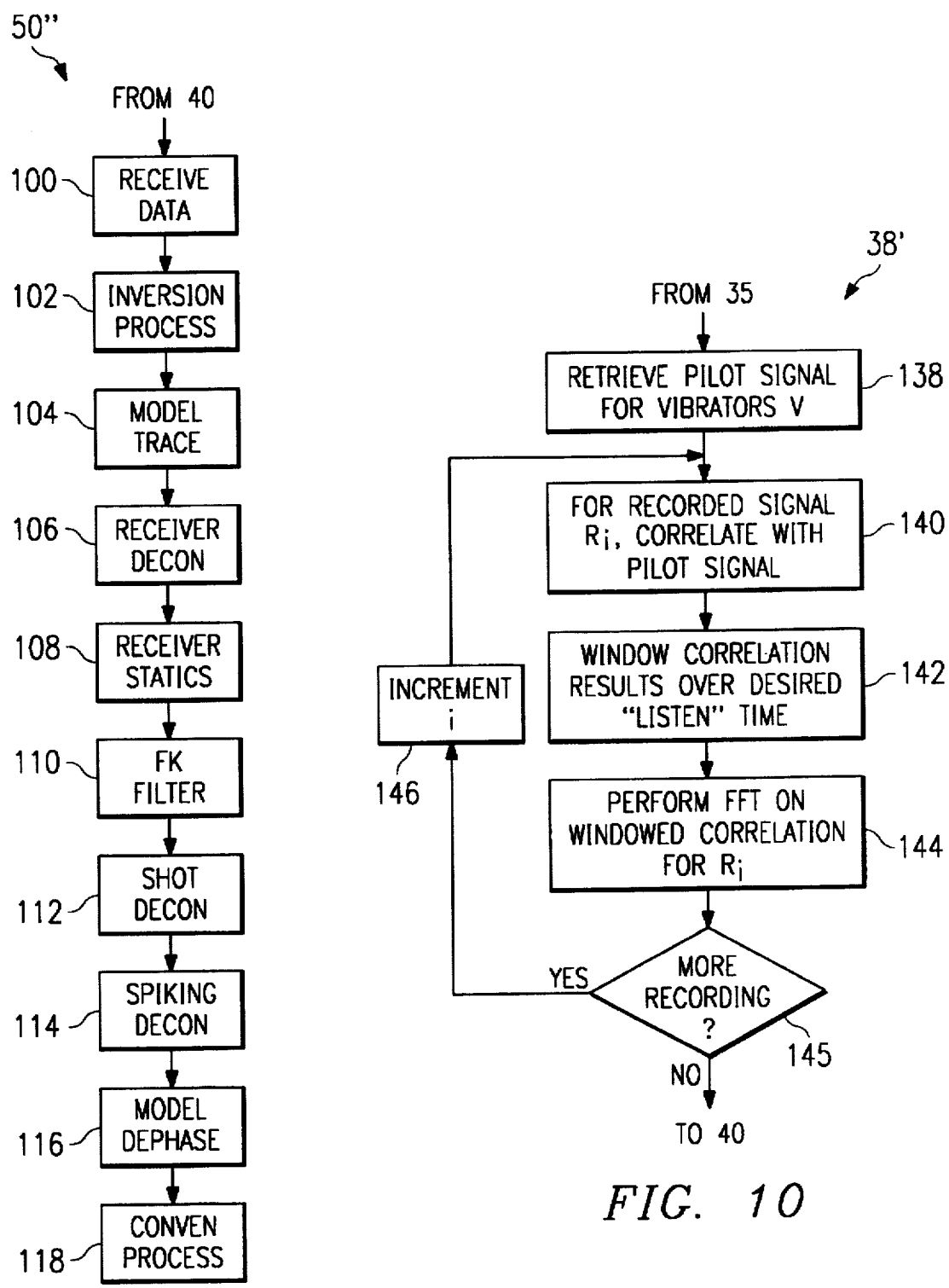
FIG. 8 is a flow chart illustrating a method for generating a seismic survey from the results of the separation process according to another embodiment of the invention.
FIG. 10 is a detailed flow chart illustrating an alternative method of transforming record data into the frequency domain, as is performed prior to the separation process according to the preferred embodiment of the invention.

In certain cases, depending upon the encoding of the sweeps, one may also compress the signal data to facilitate further processing. Referring now to FIG. 10, process 38' for not only transforming the recorded signals into the frequency domain but also for so compressing the signal data will now be described. Process 38' is an alternative embodiment of process 38, and is particularly useful in the case where the multiple sweeps are phase encoded relative to one another.

Process 38' begins with the retrieval by system computer 24 of the pilot signal for vibrators V from memory in process 138; since the sweeps are phase encoded in this case, the pilot signals applied to vibrators V will be identical with one another from sweep to sweep, except for phase shifts. Process 140 is then performed for a single recorded signal $R_i$, which may be either a signal recorded by one of geophones G, or a signal monitored by a sensor 5 on one of vibrators V, to correlate the recorded signal $R_i$ with the pilot signal retrieved in process 138. The correlation of process 140 is performed according to conventional techniques. These correlation results are then windowed by system computer 24 to a desired "listen" time in process 142, so that data corresponding to times outside of the range of interest may be discarded. System computer 24 then performs a DFT or FFT on the windowed correlation results for recorded signal $R_i$ in process 144, transforming these correlation results into the frequency domain. Decision 145 determines if additional recorded signals $R_i$ remain to be processed (including both signals recorded by geophones G and also those signals recorded by sensors 5 on vibrators V); if so, the index i is incremented and control returns to process 140 for correlation. Upon completion of the FFT of process 144 for the correlated and windowed results for each of the recorded signals $R_i$, process 38' is completed.

Accordingly, optional process 38' can greatly reduce the amount of digital data to be processed by system computer 24 according to the method to be described hereinbelow. The result of process 38' will be the FFT of the correlation between the pilot signal and the measured recorded, and is limited only to the time window of interest. Furthermore, this compression is performed early in the process, thus greatly improving the efficiency of the separation method described herein.

As will be recognized by those in the art, optional process 38' may be performed in different ways to transform and compress the signal data, depending upon the configuration of system computer 24 and also upon the type of sweep encoding. For example, the correlation and windowing of processes 140, 142 may be done in the frequency domain rather than in the time domain, in which case processes 140, 142 would be performed after the completion of process 144. Other types of conventional processing may also be done, as will be apparent to those of skill in the art from this description.

In process 40 according to the preferred embodiment of the invention, separation of the earth response along each of the paths from vibrators V to geophones G is performed upon the frequency-domain representations of the recorded vibrations generated in process 38. This separation utilizes both the recorded vibrations at geophones G and also vibrations detected at vibrators V; this is in contrast to conventional separation techniques, including phase encoding separation, which separate according to the pilot signals (i.e., idealized representations of the input vibrations). This allows the present invention to more accurately determine the earth response to vibrations, as spurious noise, non-linearities, imperfect coupling, base plate flexure, and operational problems with individual vibrators are taken into account in the separation process. Furthermore, the separation method according to the preferred embodiments of the invention determines the earth response of each path on a frequency-by-frequency basis, rather than in a frequency-independent manner as done in conventional separation techniques. As a result, the present invention enables the handling of frequency dependent effects, including harmonic coupling and other behavior, in the separation process.

Figure 4:
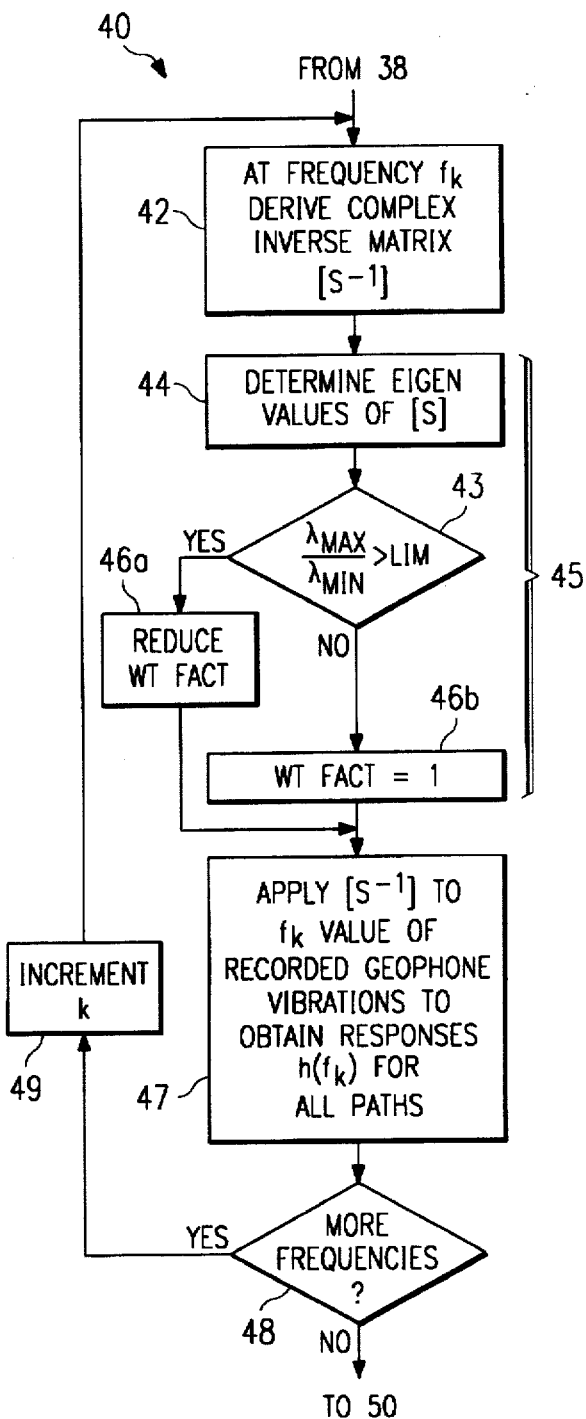
FIG. 4 is a flow chart illustrating a method of separating the earth response for each path between each of multiple vibrators in the survey of FIG. 1 and one of the geophones therein, according to a first alternative embodiment of the invention.

Referring now to FIG. 4 in combination with FIG. 1, separation process 40 will now be described in further detail relative to the multiple earth response paths between the multiple vibrators V and a single geophone G; it is of course to be understood that the process will be also performed for each of geophones G in the survey array. As shown in FIG. 1, each of vibrators $V_A$ through $V_D$ generate vibrations which are transmitted to geophone $G_1$, by way of separate physical paths. Each path corresponds to one of the response, or transfer, functions $h_A$ through $h_D$ corresponding to the paths between geophone $G_1$ and vibrators $V_A$ through $V_D$, respectively. Regardless of the type of vibration sweep used, the transfer functions h will, of course, indicate attributes of the response of the earth to vibratory energy, including reflection and refraction, and is thus useful information in generating a seismic survey of the region, and in determining the locations of sub-surface interfaces and various geological formations.

For a set of four sweeps of vibrations from the four sources $V_A$ through $V_D$, one may thus consider recorded frequency domain representations recorded at geophone $G_1$ as a system of equations for each frequency in the DFT, as follows:

$R_1 = A_1 \cdot h_A + B_1 \cdot h_B + C_1 \cdot h_C + D_1 \cdot h_D$ $R_2 = A_2 \cdot h_A + B_2 \cdot h_B + C_2 \cdot h_C + D_2 \cdot h_D$ $R_3 = A_3 \cdot h_A + B_3 \cdot h_B + C_3 \cdot h_C + D_3 \cdot h_D$ $R_4 = A_4 \cdot h_A + B_4 \cdot h_B + C_4 \cdot h_C + D_4 \cdot h_D$ where $R_n$ is the composite recorded frequency domain representation coefficient at the specified frequency at geophone G for the nth sweep, where $A_n$ is the source vibration coefficient for the specified frequency as measured at vibrator $V_A$ for the nth sweep, where $B_n$ is the source vibration coefficient for the specified frequency as measured at vibrator $V_B$ for the nth sweep, and so on. Each of the coefficients in this system will, of course, be a complex number. As the vibrations have been recorded at vibrators V in process 34 for each sweep and thus are known, and as seismic records have been obtained at geophone $G_1$ for each sweep and thus are known, the above system has four equations for four unknowns, from which a solution for the transfer functions $h_A$ through $h_D$, at the specified frequency, may be determined.

One may express the above system in matrix form as follows:

$$\begin{pmatrix} R_1 \\ R_2 \\ R_3 \\ R_4 \end{pmatrix} = \begin{pmatrix} A_1 & B_1 & C_1 & D_1 \\ A_2 & B_2 & C_2 & D_2 \\ A_3 & B_3 & C_3 & D_3 \\ A_4 & B_4 & C_4 & D_4 \end{pmatrix} * \begin{pmatrix} h_A \\ h_B \\ h_C \\ h_D \end{pmatrix}$$

which, by determining the inverse of the matrix [S] containing the source vibration representations $A_n$, $B_n$, $C_n$, $D_n$, solves for the transfer functions h, at the specified frequency:

$$\begin{pmatrix} h_A \\ h_B \\ h_C \\ h_D \end{pmatrix} = \begin{pmatrix} A_1 & B_1 & C_1 & D_1 \\ A_2 & B_2 & C_2 & D_2 \\ A_3 & B_3 & C_3 & D_3 \\ A_4 & B_4 & C_4 & D_4 \end{pmatrix}^{-1} * \begin{pmatrix} R_1 \\ R_2 \\ R_3 \\ R_4 \end{pmatrix}$$

The following description will refer to the inverse matrix of the source vibration representations as $[S^{-1}]$.

$$\begin{pmatrix} h_A \\ h_B \\ h_C \\ h_D \end{pmatrix} = \begin{pmatrix} A_1 & B_1 & C_1 & D_1 \\ A_2 & B_2 & C_2 & D_2 \\ A_3 & B_3 & C_3 & D_3 \\ A_4 & B_4 & C_4 & D_4 \end{pmatrix}^{-1} * \begin{pmatrix} R_1 \\ R_2 \\ R_3 \\ R_4 \end{pmatrix}$$

As noted above, phase encoding is generally utilized in the generation of the sweeps. In this case, each of the source vibration representations $A_n$, $B_n$, $C_n$, $D_n$ will be complex. For the example of the conventional phase encoding described above, the ideal input waveforms (i.e., the waveform of the sweeps if exactly generated by vibrators V) will have phase relationships (in degrees) according to the following table:

|         | Vibrator |     |     |     |
|---------|----------|-----|-----|-----|
|         | A        | B   | C   | D   |
| Sweep 1 | 0        | 90  | 90  | 180 |
| Sweep 2 | 90       | 0   | 180 | 90  |
| Sweep 3 | 90       | 180 | 0   | 90  |
| Sweep 4 | 180      | 90  | 90  | 0   |

In this ideal case, the matrix [S] will be represented by the following, where i is the imaginary indicator (i.e., the square root of −1, corresponding to a phase shift of 90°):

$$[S] = \begin{pmatrix} 1 & i & i & -1 \\ i & 1 & -1 & i \\ i & -1 & 1 & i \\ -1 & i & i & 1 \end{pmatrix}$$

and its inverse matrix $[S^{-1}]$ will be represented as follows:

$$[S^{-1}] = \frac{1}{4}\begin{pmatrix} 1 & -i & -i & -1 \\ -i & 1 & -1 & -i \\ -i & -1 & 1 & -i \\ -1 & -i & -i & 1 \end{pmatrix}$$

However, it has been observed that the actual vibratory energy imparted into the earth by conventional vibrators is somewhat distorted from the ideal input waveform. This distortion is due to the imperfect translation of the desired waveform from a control signal into actual vibrations because of non-linearities in the operation of vibrators V, imperfect coupling of vibrators V to the earth, base plate flexure, and in harmonic coupling among vibrators V. In addition, it has been observed that conventional vibrators V are not perfectly repeatable in their output from sweep to sweep. Each of these effects introduces error into the separation and analysis processes when the matrix of phases from the idealized waveforms is used.

Accordingly, as noted above, the matrix [S] and its inverse $[S^{-1}]$ used in process 40 according to this embodiment of the invention are based on actual vibration measurements at vibrators V, such as taken by sensors (e.g., accelerometers) 5 in FIG. 1, and by such other conventional transducers as may be used to measure the actual operation of vibrators V. Furthermore, since many of the distortion effects (particularly harmonic effects) are dependent upon the frequency of the vibrations, the method according to the preferred embodiment of the invention operates individually upon discrete frequencies in the range, using the complex frequency-domain coefficients of the measured vibrations both at vibrators V and geophones G.

As such, referring to FIG. 4, separation process 40 begins with process 42, in which the inverse complex matrix $[S^{-1}]$ is determined at a first frequency $f_k$. System computer 24 determines this inverse matrix, at this frequency $f_k$, by retrieving the amplitude and phase of the frequency domain vibration measurements at vibrators V for frequency $f_k$ from memory, followed by the use of conventional numerical analytical techniques to determine the determinant and cofactors of the initial matrix [S], and to generate the coefficients of inverse matrix $[S^{-1}]$. As should be evident from the foregoing, inverse matrix $[S^{-1}]$ is based upon the actual behavior of vibrators V in their generation of the vibratory energy in process 32.

For example, if vibrator $V_A$ failed to operate at all in the first sweep, and if vibrator $V_D$ had a phase and amplitude error in the fourth sweep, matrix [S] for a set of four sweeps that are phase-encoded as described above would appear, for a given frequency $f_k$, as follows:

$$[S] = \begin{pmatrix} 0 & i & i & -1 \\ i & 1 & -1 & i \\ i & -1 & 1 & i \\ -1 & i & i & 0.7 + 0.1i \end{pmatrix}$$

Inverse matrix $[S^{-1}]$ for frequency $f_k$, determined in process 42 for this example, would result in the following:

$$\begin{pmatrix} 0.37 - 0.014i & 0.007 - 0.315i & 0.007 - 0.315i & -0.37 + 0.014i \\ 0.007 - 0.315i & 0.158 + 0.003i & -0.342 + 0.003i & -0.007 - 0.185i \\ 0.007 - 0.315i & -0.342 + 0.003i & 0.518 + 0.003i & -0.007 - 0.185i \\ -0.37 + 0.014i & -0.007 - 0.0185i & -0.007 - 0.185i & 0.37 - 0.014i \end{pmatrix}$$

As noted hereinabove and as will be described hereinbelow, inverse matrix $[S^{-1}]$ may be used to readily determine the earth response for each of the paths from vibrators $V_A$ through $V_D$ to geophone $G_1$ at frequency $f_k$.

According to the preferred embodiment of the invention, process 45 is next carried out to set a quality value for the inverse matrix $[S^{-1}]$ from process 42. While process 45 is optional to the separation process 30 described herein, it is believed to be useful to identify those frequencies at which the solution is so unstable as to be discounted from the frequency domain processing described herein. For example, the frequency response at frequencies outside of the sweep range will likely be unreliable, as will frequencies at which harmonic effects are acute. In the example of process 45 described herein, a quality value will be determined as a weighting factor by which the result of the transfer or response functions at frequency $f_k$ can be multiplied (a well-behaved operation receiving a maximum weighting factor of unity). Alternatively, the quality factor may be used to derive a filter applied to the end result of the separation, or as an on-site quality control measurement, so that one or more sweeps may be re-run if the quality values are excessively low therefor.

As shown in FIG. 4, process 44 initiates process 45 by calculating the eigenvalues $\lambda$, also referred to as the characteristic values, for the matrix $[S]$ at the frequency $f_k$. As is well known in the art, the eigenvalues for complex matrices, such as matrix $[S]$ according to this embodiment of the invention, will themselves be complex numbers. It has been observed that the determination of earth response functions h is not reliable for those cases in which the matrix $[S]$ is poorly behaved, which is the case when one or more of the eigenvalues $\lambda$ for the matrix $[S]$ is small. Decision 43 according to this embodiment of the invention thus determines a quality value QV that depends upon the size of the eigenvalues for matrix $[S]$, and particularly upon the size of the minimum eigenvalue. For example, quality value QV may be defined as follows:

$$QV = \lambda_{max}/\lambda_{min}$$

where $\lambda_{max}$ and $\lambda_{min}$ are the maximum and minimum absolute values of the set of eigenvalues for matrix $[S]$; in this example, quality value QV corresponds to the condition number of matrix $[S]$. Accordingly, QV is high when matrix $[S]$ is poorly behaved. Of course, alternative definitions of quality value QV may alternatively be used to measure the stability and accuracy of the solution; for example, the quality value QV may correspond to a function of the condition number of matrix $[S]$ or another function of the eigenvalues. According to the preferred embodiment of the invention, decision 43 thus determines, for the frequency $f_k$, whether the matrix $[S]$ is so poorly behaved by comparing the quality value QV against a limit. If QV exceeds the limit, then a reduced weighting factor is generated in process 46a for matrix $[S]$ at frequency $f_k$; for example, the weighting factor may be the reciprocal of quality value QV. On the other hand, if matrix $[S]$ is well behaved (i.e., its quality value QV is less than the specified limit), then its weighting factor may remain at unity (process 46b).

Following process 45 (if performed), process 47 is next performed according to the preferred embodiment of the invention to determine the transfer functions $h_A$ through $h_D$ (in this example), for all of the paths from vibrators $V_A$ through $V_D$ for the geophones G in the survey region. Process 47 may be performed according to various alternative techniques, as will now be described.

As discussed above, the following matrix equation corresponds to the application of source energy to the survey region, for the example of geophone $G_1$:

$$[R]=[S]\cdot[h]$$

where $[R]$ is the set of seismic records for geophone $G_1$ over the four sweeps, where $[S]$ is the matrix of source energy applied by vibrators $V_A$ through $V_D$ over the four sweeps, and where $[h]$ is the matrix of transfer functions. As such, since $[R]$ and $[S]$ are known by the measurements of process 34, and since the inverse matrix $[S^{-1}]$ was found in process 42, process 47 can be used to solve for transfer functions $[h]$ at frequency $f_k$ by the following matrix multiplication:

$$[h]=[S^{-1}]\cdot[R]$$

This matrix multiplication can be readily performed by system computer 24 described hereinabove, as will be apparent to those of skill in the art.

Decision 48 is then performed to decide if additional frequencies remain to be analyzed by separation process 40. If so, control passes to process 49 in which the frequency index k is incremented to the next discrete frequency in the frequency-domain representation of the measured vibrations. Of course, if no additional frequencies remain to be analyzed, control passes to process 50 of FIG. 3.

The above approach used a conventional phase encoding scheme, in which each of the vibrators V were activated in process 32 during each sweep. Since this embodiment of the invention accounts for missing or inoperable vibrators in certain sweeps, according to an alternative embodiment of the invention, one of the vibrators V is intentionally turned off, or not activated, during each sweep in process 32. According to this alternative embodiment of the invention, no phase encoding is necessary (i.e., all vibrations are in phase with one another). Accordingly, the ideal source vibration matrix $[S]$ in this alternative embodiment of the invention would be (for all frequencies):

$$[S] = \begin{pmatrix} 0 & 1 & 1 & 1 \\ 1 & 0 & 1 & 1 \\ 1 & 1 & 0 & 1 \\ 1 & 1 & 1 & 0 \end{pmatrix}$$

Of course, measurements of the vibrations at vibrators V would again be performed, to account for non-repeatability problems, non-linearities, harmonic coupling, and the like. In the ideal case, the inverse matrix $[S^{-1}]$ for frequency $f_k$ determined in process 42 for this example, would be:

$$[S^{-1}] = \begin{pmatrix} -0.677 & 0.333 & 0.333 & 0.333 \\ 0.333 & -0.677 & 0.333 & 0.333 \\ 0.333 & 0.333 & -0.677 & 0.333 \\ 0.333 & 0.333 & 0.333 & -0.677 \end{pmatrix}$$

Again, the actual values of inverse matrix $[S^{-1}]$ will depend upon measured vibrations at vibrators V. Besides use of a different encoding scheme, the remainder of the method according to this embodiment of the invention proceeds as described hereinabove.

Figure 5:
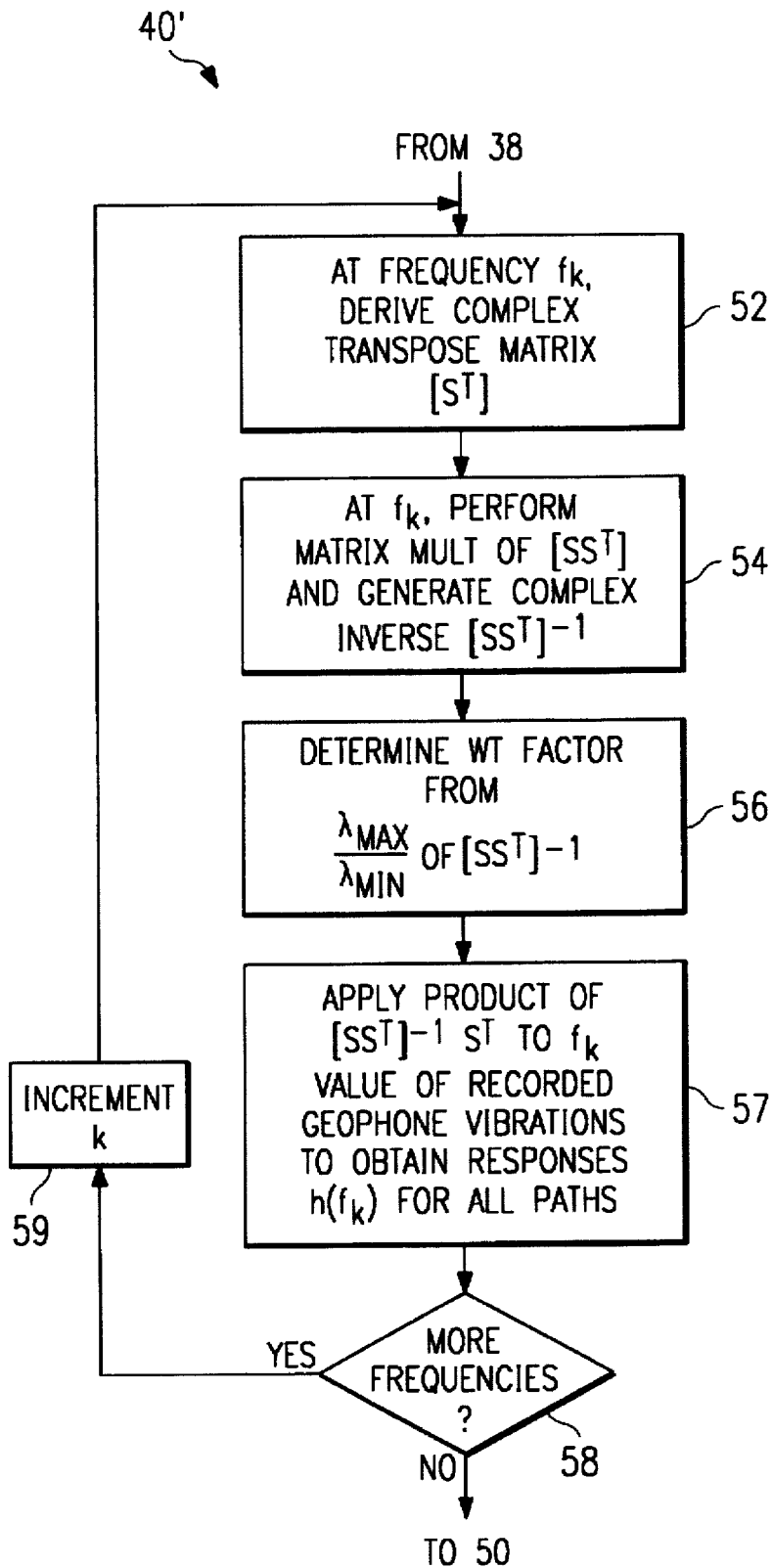
FIG. 5 is a flow chart illustrating a method of separating the earth response for each path between each of multiple vibrators in the survey of FIG. 1 and one of the geophones therein, according to a second alternative embodiment of the invention.

Referring now to FIG. 5, separation process 40' according to an alternative embodiment of the invention will now be described in detail. Process 40', similarly as process 40 previously described, is directed to determining the transfer functions h for each path between vibrators $V_A$ through $V_D$ and geophones G. According to process 40', however, additional reliability in the determination of the earth response is provided by over-specifying the system of equations upon which the process is based, in combination with using the actual measured vibrations at the vibratory sources.

This additional reliability obtained from this alternative embodiment of the invention is particularly useful in eliminating the effects of noise from the recorded seismic vibrations. As is well known in the art, geophones G in a survey often detect vibrations that are unrelated to the vibratory energy imparted by vibrators V, or may generate signals that are unrelated to any vibrations; such unrelated vibrations or spurious signals are commonly referred to as noise, and will obviously reduce the ability of the survey to accurately distinguish and analyze the imparted vibratory energy.

In the general sense, therefore, one may consider the recorded composite seismic records $R_n$ by a single geophone G for the nth sweep in a plurality of sweeps as follows:

$$R_n = A_n \cdot h_A + B_n \cdot h_B + C_n \cdot h_C + D_n \cdot h_D + N_n$$

As before, $R_n$ is the recorded composite frequency domain representation at geophone G for the nth sweep, $A_n$ is the source vibration data from vibrator $V_A$ for the nth sweep, $B_n$ is the source vibration data from vibrator $V_B$ for the nth sweep, and so on. In addition, the contribution of noise to the sweep is present in this equation by the term $N_n$. It should be evident from the above that solution, for the earth response or transfer functions h, of a system of equations as presented by the above will be complicated due to the presence of the noise terms $N_n$. It is therefore useful to reduce the effects of noise from the recorded seismic records, so as to improve the accuracy and resolution of the vibratory seismic survey.

According to process 40', which is an alternative embodiment of the separation process described hereinabove, the effects of noise in the recorded seismic traces are reduced. It has been observed that recorded noise in the vibratory seismic survey is mostly made up of so-called random noise; in other words, the noise recorded in one sweep generally does not correlate to noise recorded in later sweeps. Process 40', as will now be described, utilizes the randomness of the recorded noise to cancel out its effects among multiple sweeps.

Firstly, according to this embodiment of the invention, more sweeps must be performed in process 32 (FIG. 3) than the number of vibrators V in the survey. In other words, the system of equations for seismic records $R_n$ must be over-specified. The energy from each of vibrators $V_A$ through $V_D$ is preferably encoded in some manner, such as the phase encoding described hereinabove; the extra sweep (i.e., the fifth sweep from the four vibrators) may simply replicate one of the previously performed sweeps, or the phase encoding scheme may instead contemplate the performing of five sweeps. In the survey of FIG. 1, where four vibrators $V_A$ through $V_D$ are energized, an over-specified system with five sweeps is represented by:

$$R_1 = A_1 \cdot h_A + B_1 \cdot h_B + C_1 \cdot h_C + D_1 \cdot h_D + N_1$$
$$R_2 = A_2 \cdot h_A + B_2 \cdot h_B + C_2 \cdot h_C + D_2 \cdot h_D + N_2$$
$$R_3 = A_3 \cdot h_A + B_3 \cdot h_B + C_3 \cdot h_C + D_3 \cdot h_D + N_3$$
$$R_4 = A_4 \cdot h_A + B_4 \cdot h_B + C_4 \cdot h_C + D_4 \cdot h_D + N_4$$
$$R_5 = A_5 \cdot h_A + B_4 \cdot h_B + C_5 \cdot h_C + D_5 \cdot h_D + N_5$$

where terms $N_n$ correspond to the recorded noise in the system. Assuming noise terms $N_n$ to be random, such that $\Sigma N_n = 0$ over the frequencies of interest, records $R_n$ may be expressed as the following system:

$$\begin{pmatrix} R_1 \\ R_2 \\ R_3 \\ R_4 \\ R_5 \end{pmatrix} = \begin{pmatrix} A_1 & B_1 & C_1 & D_1 \\ A_2 & B_2 & C_2 & D_2 \\ A_3 & B_3 & C_3 & D_3 \\ A_4 & B_4 & C_4 & D_4 \\ A_5 & B_5 & C_5 & D_5 \end{pmatrix} \cdot \begin{pmatrix} h_A \\ h_B \\ h_C \\ h_D \end{pmatrix}$$

or, where the matrix [S] corresponds to the matrix of source vibrations from vibrators $V_A$ through $V_D$:

$$[R] = [S] \cdot [h]$$

However, the matrix [S] is not a square matrix, as the number of sweeps is greater than the number of vibrator-to-geophone paths (i.e., the matrix [S] represents an over-specified system). Accordingly, solution of the above matrix equation for the transfer functions [h] must be performed in several steps. For example, both sides of the above equation may be multiplied by transpose matrix [ST], providing the following equation:

$$[S^T][R] = [S^T S] \cdot [h]$$

Solution for transfer functions [h] for each of the vibrator paths may thus be done, using the "generalized inverse" of matrix [S], as follows:

$$[h] = [S^T S]^{-1} \cdot [S^T][R]$$

These relationships are used in separation process 40' shown in FIG. 5, as will now be described. Separation process 40' begins with process 52, in which system computer 24 retrieves the amplitude and phase information of the measured vibrations at vibrators V, at the frequency $f_k$ (i.e., the matrix [S]); process 52 further includes the determination of transpose matrix [$S^T$] from matrix [S]. The determination of transpose matrix [$S^T$] in process 52, as is well known in the art, may be performed simply through reversal of the positional indices of each matrix element (i.e., rows become columns), and as such may be readily performed by system computer 24. Preferably, no additional storing of elements of transpose matrix [$S^T$] need be done in process 52, so long as system computer 24 is programmed, in subsequent steps, to retrieve the complex coefficients of matrix [S] in a transposed manner.

Process 54 is next performed, in which system computer 24 generates the inverse matrix $[S^T S]^{-1}$ for the frequency $f_k$. Preferably, process 54 first performs the matrix multiplication of $[S^T] \cdot [S]$, and then determines the inverse matrix $[STS]^{-1}$ through conventional numerical steps within the capability of system computer 24, involving calculation of the determinant and respective cofactors of the product matrix [$S^T S$], as described hereinabove. Optional process 56 may then be performed if desired, similarly as described above for process 45 in separation process 40, to determine a weighting factor indicative of the regularity of (i.e., how "well-behaved" are) the sweeps performed in the survey for frequency $f_k$. As described above relative to process 45, this weighting factor may be used to adjust the results of the survey for those frequencies where noise, non-linearities, harmonics, or other phenomenon are of such an extent as to call into question the results at that frequency $f_k$.

Following process 54 or process 56, as the case may be, separation process 40' determines the earth response for each of the paths between one of vibrators V and geophone $G_1$, as specified by the matrix of transfer functions [h]. This is performed in process 57, in which the complex inverse matrix $[S^TS]^{-1}$ is applied to the records from geophone $G_1$ for each of the sweeps (i.e., is applied to the product matrix $[S^T][R]$) by conventional numerical matrix multiplication operations performable by system computer 24. Accordingly, as a result of process 57, the set of transfer functions [h] for geophone $G_1$, corresponding to each of the vibrator-to-geophone paths, is determined by separation process 40'.

Of course, while separation process 40' is described above for a single geophone $G_1$, it is to be understood that process 40' is performed at frequency $f_k$ for each of geophones G in the survey region.

Following process 57, decision 58 is performed in order to determine if additional frequencies remain to be separated according to separation process 40'. If so, the frequency index k is incremented to point to the next discrete frequency in the frequency domain data corresponding to the detected vibrational data at vibrators V and geophones G. Process 40' is then repeated for that frequency. Once all desired frequencies have been performed (i.e., decision 58 returns "NO"), control passes to process 50 for further processing of the survey data.

Referring back to FIG. 3, upon completion of either of separation processes 40, 40', process 50 may now be performed to use the separated earth response functions for each vibrator-to-geophone path in generation of the seismic survey. The specific approaches to generation of a seismic survey based upon the transfer functions and earth response found for each path are conventional in the art, with the particular process selected according to the desires of the geologist.

Figure 6A:
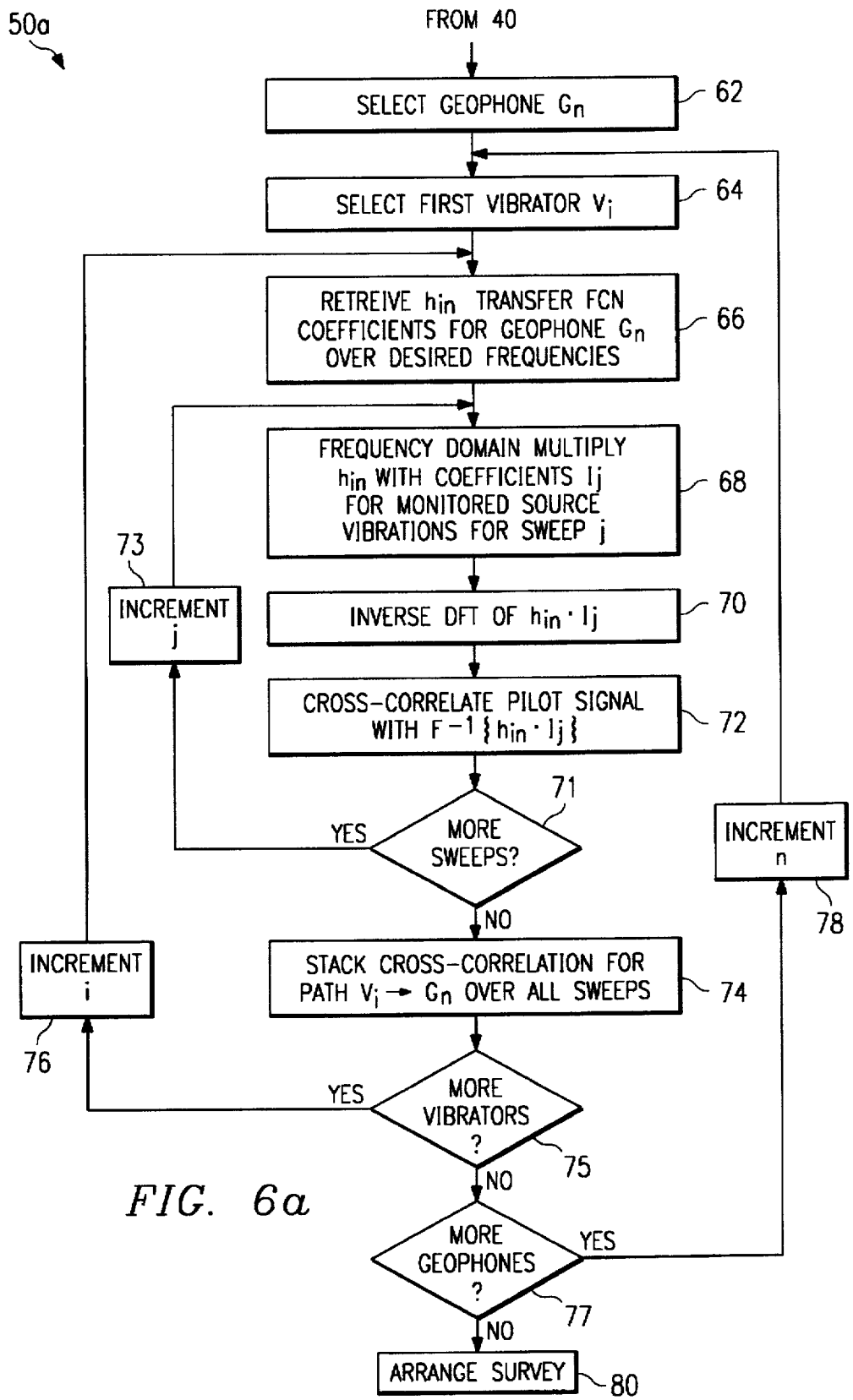
FIGS. 6a and 6b are flow charts illustrating alternative methods for generating a seismic survey from the results of the separation process according to the preferred embodiments of the invention.
Figure 6B:
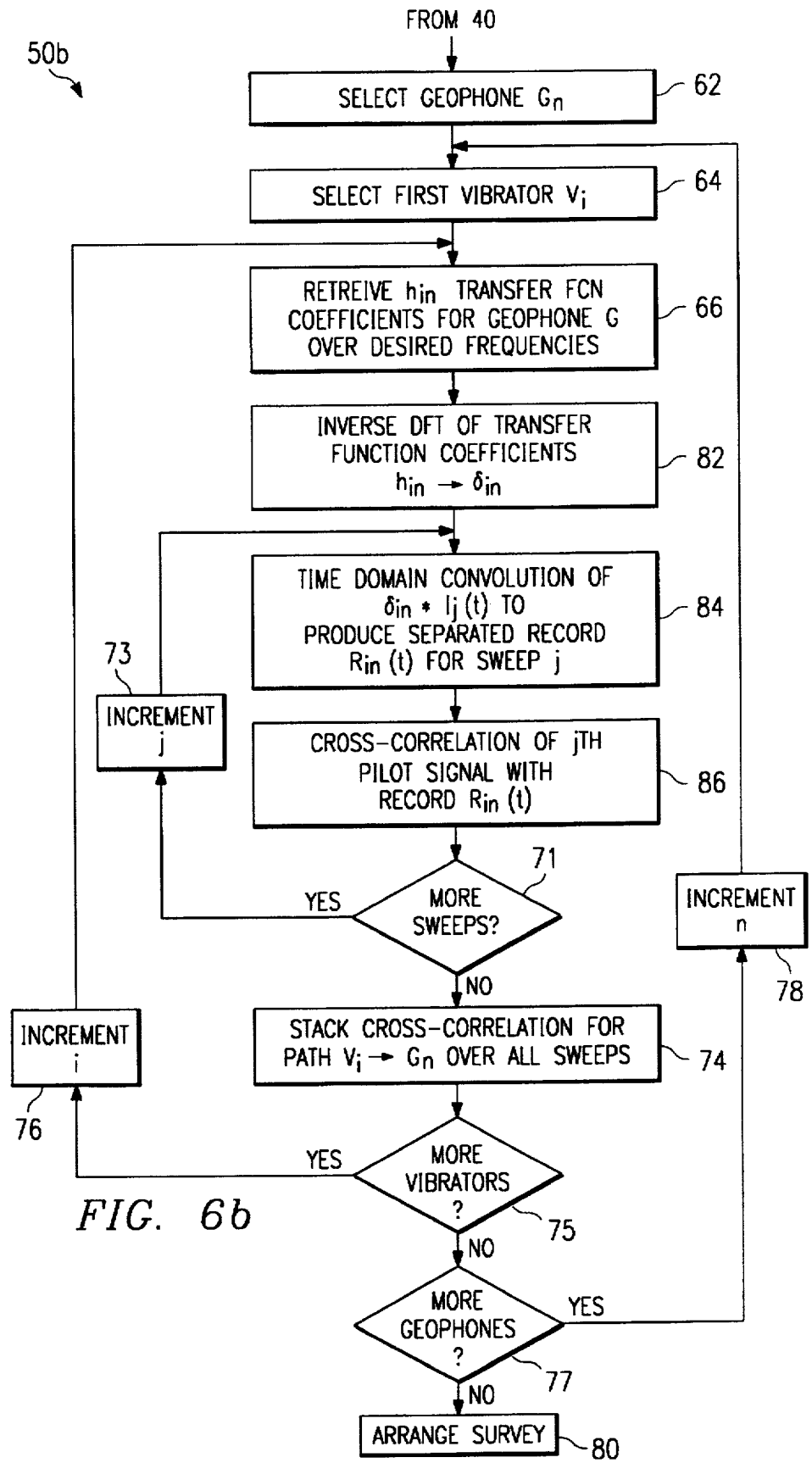

Referring now to FIGS. 6a and 6b, alternative embodiments of processes 50 for generating a seismic survey from the results of separation process 40, 40' described hereinabove will now be described in detail. Processes 50a, 50b illustrated in FIGS. 6a and 6b, respectively, are equivalent to one another, with process 50a of FIG. 6a performed in the frequency domain and process 50b of FIG. 6b performed in the time domain. As will be evident from the following description, processes 50a, 50b are within the capability of system computer 24.

Referring first to FIG. 6a, process 62 is first performed, in which a particular geophone $G_n$ is selected for analysis; process 64 then selects a first vibrator $V_i$, thus selecting the path between vibrator $V_i$ and geophone $G_n$ for analysis in a first pass of process 50a. Process 66 is then performed, in which the coefficients of transfer function corresponding to the path between vibrator $V_i$ and geophone $G_n$ are retrieved by computer system 24 from memory, for each frequency point in the frequency domain representation. As such, retrieval process 66 retrieves a frequency domain spectrum of complex coefficients for transfer function $h_{in}$. As described hereinabove, these coefficients in transfer function $h_{in}$ may also include or have been modified by weighting factors produced by process 45 described above, such that the coefficients at specific frequencies may have been discounted to some extent if the matrix of coefficients of the monitored source vibrations were not well-behaved.

In process 68, the frequency domain coefficients $h_{in}$ are multiplied by the frequency domain coefficients $I_j$ for the monitored source vibrations from vibrator $V_i$ in a first sweep j. This multiplication of process 68 is merely a point-by-point multiplication of each coefficient in transfer function $h_{in}$ by the coefficient for the same frequency in the monitored set of coefficients $I_j$ for sweep j. Process 70 then performs an inverse Discrete Fourier Transform of this product of $h_{in} \cdot I_j$, transforming this result into the time domain. The result of process 70 is thus a time domain representation of vibrations that correspond to those actually detected at geophone $G_n$ based solely upon the source vibrations from vibrator $V_i$, using the transfer function $h_{in}$ for the path therebetween; this result is thus an idealized representation of the actual detected vibrations, where the contributions of vibrator $V_i$ are separated from those from the other vibrators V.

Process 72 is then performed, by way of which the pilot signal used to drive vibrator $V_i$ in sweep j is cross-correlated with the time domain representation of the product $h_{in} \cdot I_j$. The result of process 72 will thus be a time-based indication of the arrival of vibratory energy at geophone $G_n$, from which the depth of reflective interfaces may be derived. Of course, as is well known in the art, the effects of random noise on such time-based records may be eliminated by the stacking of multiple records (in which the signal will reinforce and in which the random noise will tend to cancel). Accordingly, decision 71 determines if data from additional sweeps of vibrator $V_i$ remain to be analyzed for geophone $G_n$; if so, the sweep index j is incremented (process 73) and control passes to process 68, in which the product of the transfer function coefficients $h_{in}$ with the source vibrations $I_j$ for the next sweep is again performed, and the process repeated.

Upon completion of the frequency domain multiplication (process 68), inverse DFT (process 70) and cross-correlation (process 72) for all sweeps of vibrator $V_i$ in the survey, system computer 24 stacks the cross-correlation records for energy between source $V_i$ and geophone $G_n$, in process 74. The resulting stacked record is thus suitable for use in conventional seismic survey generating methods, indicative of the time delay between source vibrations generated by vibrator $V_i$ and geophone $G_n$.

As illustrated in FIG. 6a, this process may then be repeated for energy from each of the vibrators $V_i$ to geophone $G_n$, by way of decision 75 which determines if additional vibrators V are to be analyzed for geophone $G_n$; if so, the vibrator index i is incremented (process 76) and control passes to process 66, to repeat the analysis for the next vibrator $V_i$. If all vibrators V have been analyzed for geophone $G_n$, decision 77 similarly determines if additional geophones G are to be analyzed in the above-described fashion; if so, the geophone index n is incremented (process 78), and control returns to process 64, in which the process is repeated for all of the vibrators V that imparted energy sensed by the next geophone $G_n$.

Upon completion of process 50a for all vibrators V and all geophones G in the survey, process 80 is then performed, by way of which the seismic survey is arranged in the desired manner, as is conventional for vibratory seismic surveys. For example, process 80 may include common depth point (CDP) gathers, normal move-out (NMO) operations and the like, which present the survey data in a more usable form for the geologist. The survey method of FIG. 3 is then complete.

In process 50a described hereinabove, much of the method was done for coefficients in the frequency domain. This type of operation is especially suitable for modern system computers 24 that incorporate digital signal processors (DSPs), and which are therefore particularly well-suited to perform frequency domain operations and inverse DFT operations. Many conventional system computers 24, however, are better suited for time domain operations such as convolution. Process 50b, illustrated in FIG. 6b, is better suited for computers of this type. The same steps in process 50b as in process 50a are indicated by like reference numerals in FIGS. 6a and 6b.

In process 50b of FIG. 6b, processes 62, 64, 66 are performed as before, so that the $h_{in}$ transfer function coefficients corresponding to the path between vibrator $V_i$ and geophone $G_n$ are retrieved, for all of the frequencies under analysis, from memory by system computer 24. The coefficients retrieved in process 66 may have been modified by weighting factors produced by process 45 described above, to discount the coefficients at those ill-behaved frequencies in the system. In process 82, system computer 24 then performs the inverse DFT of the transfer function coefficients $h_{in}$, generating a series $\delta_{in}$ of time domain coefficients representative of the time domain impulse response of the earth to vibratory seismic energy.

For a first sweep j, process 84 is then performed, in which the impulse response series $\delta_{in}$ is convolved with the time domain record $I_j(t)$ of the monitored source vibrations from vibrator $V_i$ in sweep j. As discussed above relative to FIG. 3, the source vibrations monitored by sensors 5 is recorded in process 34 as a time domain signal, and is later transformed into the frequency domain by the DFT of process 38. It is therefore preferable, if process 50b is known to be the analysis process, to retain the time domain record of the source vibrations from process 34 for use in process 84. Of course, if the time domain representation has not been retained (but the frequency domain transform representation has been stored), the time domain signal $I_j(t)$ may be obtained by an inverse DFT operation prior to the convolution of process 84. As is well known in the art, the time domain convolution of the impulse response series with the source vibrations $I_j(t)$ from vibrator $V_i$ in sweep j will produce a time domain representation that corresponds to the separated contribution of vibrator $V_i$ to the vibrations recorded by geophone $G_n$ for the jth sweep.

According to process 50b of FIG. 6b, the product of the convolution of process 84 is then cross-correlated with the pilot signal used to drive vibrator $V_i$ in the jth sweep. This cross-correlation is done in the manner described hereinabove relative to process 50a, to produce a time-based indication of the arrival of vibratory energy at geophone $G_n$, useful in deriving the depth of reflective interfaces.

As in the case of process 50a of FIG. 6a, process 50b is completed by repetition of processes 68, 70, 72 for each of the sweeps performed for the source-geophone pair $V_i$, $G_n$, followed by the stacking of the cross-correlation records to remove the effects of random noise. The process is then performed for each of the vibrators V for each of the geophones G of interest in the survey, followed by arrangement of the survey in process 80 according to the desired format, gathers, and move-out corrections.

According to either of processes 50a, 50b, the separation of the contributions of each vibrator V from the composite recorded vibrations at each geophone G allows for the accurate determination of the seismic survey. In particular, the ability to separate the vibration signals according to this embodiment of the invention greatly improves the resolution of the survey, since the paths between individual vibrators and geophones may be analyzed, rather than being limited to a generalized analysis of the path between the entire source array and each geophone, as is common in the art. This improved resolution will, of course, improve the accuracy of the seismic survey, and its sensitivity to small but important geological features.

Figure 7A:
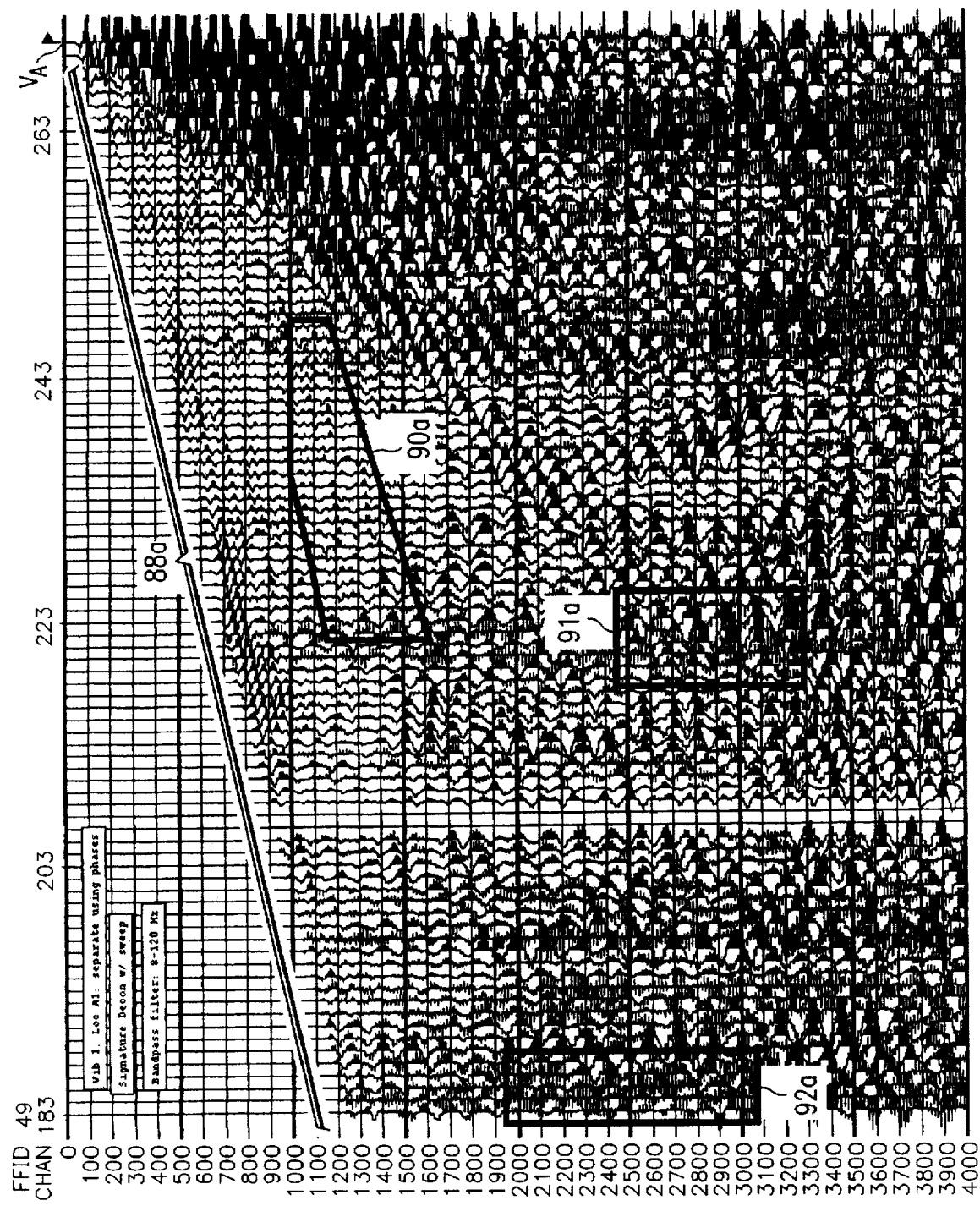
FIGS. 7a and 7b are seismic traces for an exemplary survey generated according to the conventional phase separation technique and according to the preferred embodiment of the invention, respectively.
Figure 7B:
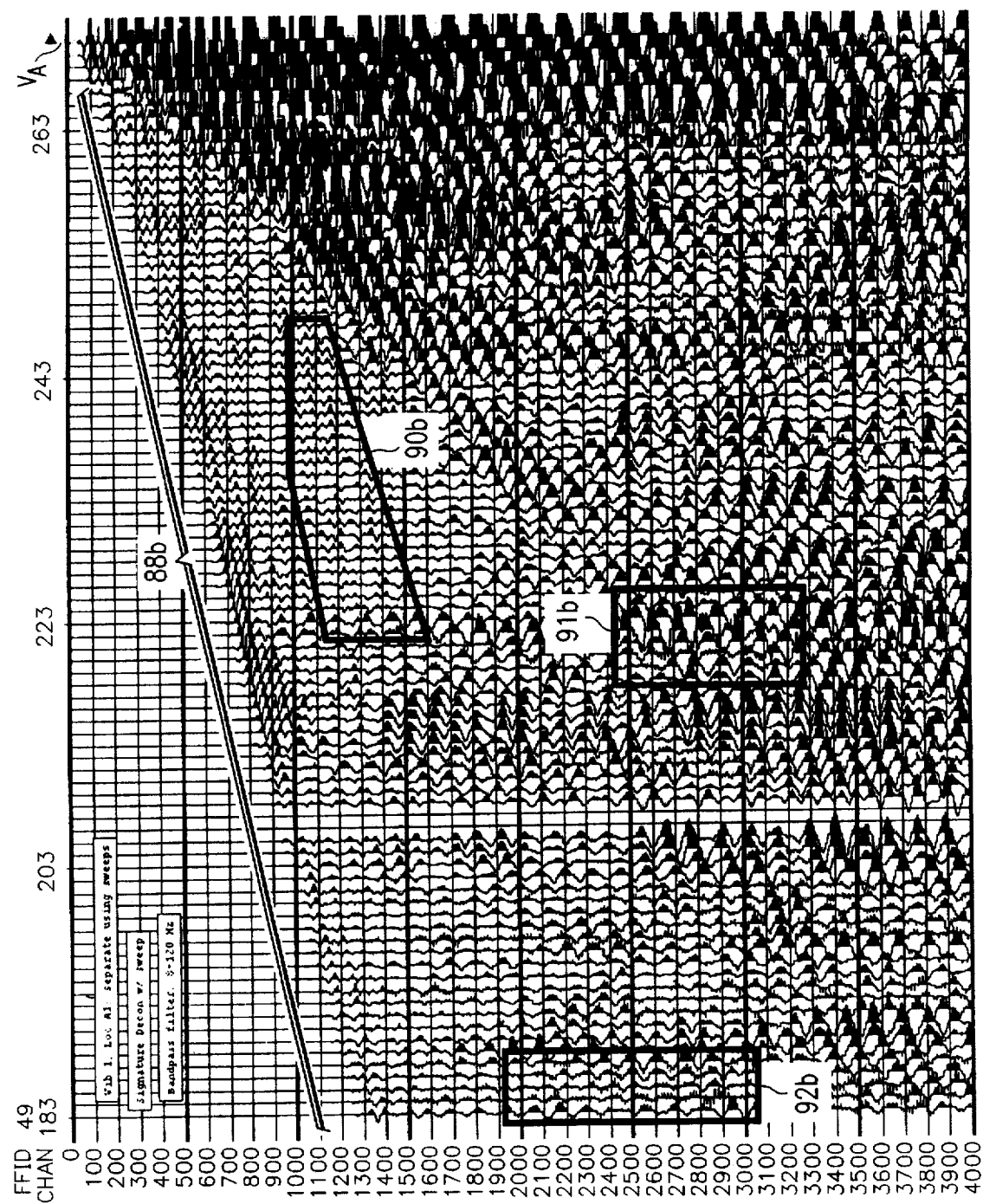

Referring now to FIGS. 7a and 7b in combination, an example of a vibratory seismic survey will now be described. FIG. 7a illustrates a series of traces recorded by a line of geophones extending at various distances from a vibrator location $V_A$. In FIG. 7a, each vertical trace corresponds to a record from a single geophone, displayed in the manner conventional in the art with the time axis extending from the top of the Figure toward the bottom, and with the distance from vibrator location $V_A$ increasing from the right to left in the Figure. The example of FIG. 7a illustrates the contribution of energy to the record from vibrator $V_A$ in a survey in which four vibrators V were simultaneously operated and phase encoded according to the Table set forth hereinabove in the Background of the Invention. The plot of FIG. 7a was then generated by the conventional method of phase separation described hereinabove in the Background of the Invention relative to the phase encoding technique.

Referring now to FIG. 7b, a plot of the contribution of vibrator $V_A$ for the survey of FIG. 7a is illustrated, where the separation of the contribution from vibrator $V_A$ was performed according to the preferred embodiment of the invention. The traces of FIG. 7b were then generated by the product of the transfer functions $h_A$ (for vibrator $V_A$) and the measured source vibrations at vibrator $V_A$, for each geophone at each frequency, followed by the inverse DFT of the result to generate the time domain trace.

A comparison of FIGS. 7a and 7b will illustrate the improvement provided by the preferred embodiment of the invention described hereinabove. Firstly, the first arrival times indicated by region 88b of FIG. 7b are much more regular and consistent than the first arrival times indicated by region 88a of FIG. 7a, thus improving the ability to account for near-surface layer thickness variations when making static corrections using the velocity of refracted waves in the near-surface layer. Regions 90a, 90b of FIGS. 7a, 7b, respectively, correspond to a portion of the survey in which a reflection event is occurring (i.e., the time and distance at which a subsurface interface is detected); a comparison of FIGS. 7a, 7b will show that the fidelity of region 90b at this event is much improved over that of region 90a, facilitating the analysis and identification of the reflective event. In addition, comparison of respective regions 91a, 91b and 92a, 92b, between FIGS. 7a and 7b, will show that the preferred embodiment of the invention improves the survey through its reduction of high frequency noise in deeper portions of the survey.

According to another embodiment of the invention, process 50 may be implemented to apply the frequency-domain transfer functions [h] by way of an inversion process as described in copending application Ser. No. 08/435,940, filed May 5, 1995, now U.S. Pat. No. 5,550,786, issued Aug. 27, 1996 assigned to Mobil Oil Corporation, and incorporated herein by this reference with the permission of Mobil Oil Corporation.

According to this approach, each transfer function $h_{v-g}(f)$ in the frequency domain (where v and g indicate the vibrator and geophone indices of the specific vibrator-to-geophone path) corresponds to a reflectivity function E times a minimum phase function M. The minimum phase function M incorporates some effects of the earth (e.g., the weathered near-surface layer) and also the impedance of vibrators V in generating the input vibratory energy.

As discussed above, according to the preferred embodiments of the present invention, a signal which is minimum phase related to the actual force generated into the surface of the earth is measured by sensors 5 directly from vibrators V. As such, an actual signal is used in this analysis process instead of a theoretical pilot signal as is conventional in the art. As described in the above-incorporated U.S. Pat. No. 5,530,786, the recording of vibratory motion and the processing of the recorded seismic data is done in such a way that the unknown actual applied force need not be known. The only important factor is that the measured quantity is directly proportional to actual force applied. In this manner, the actual force can be eliminated by division.

According to this embodiment of the invention, it is recognized that the motions measured by sensors 5 on vibrators V are related to the actual output force or signal imparted into the earth by a minimum phase transfer function in the frequency domain. In the frequency domain, the measured output force signal S thus corresponds to the product of the true vibrator output U and transfer function of minimum phase T:

$$S = U \cdot T$$

where · represents multiplication in the frequency domain. Transfer function T is a minimum phase, causal, linear system relating true vibrator output U with the measured vibrator motion U. In this equation both the minimum phase transfer function, T, and the actual output source force, U, are unknown.

The seismic records R detected by geophones G (or hydrophones) are represented in the frequency domain by the convolution of the time derivative of the actual source force U with the reflectivity E of the earth as indicated by the following formula:

$$R = j\omega \cdot U \cdot E$$

where R represents the measured seismic data, jω represents the time derivative, and E represents the earth reflectivity function.

By using inverse filtering through a minimum phase band pass filter the ratio of R/S can be readily computed. This ratio eliminates the unknown U, the source output force, from the equation as follows:

$$\frac{R}{S} = \frac{j\omega \cdot U \cdot E}{U \cdot T} = \frac{j\omega}{T} \cdot E$$

As is evident from the foregoing, the unknown actual vibrational force U has been eliminated from the equation. A scaling factor is also required to preserve total energy through the inverse filtering process.

The seismogram is now represented by R/S and constitutes the desired answer of earth reflectivity E, convolved (in the time domain) with a minimum phase function jω/T. It is a property of minimum phase functions that their derivative and their reciprocal are also minimum phase. The seismogram can be further processed with minimum phase deconvolution to obtain E, the reflectivity impulse response of the earth in the frequency domain. In essence the R/S seismogram is the band limited impulse seismogram. It is causal and minimum phase related to the earth response. The accuracy of this approach is high, since reliance on the actual, yet unknown, source vibratory motion has been eliminated.

With reference to the method discussed hereinabove, primarily relative to process 47, a matrix operation would be performed by system computer 24 to provide [R]/[S]; in other words, this ratio would be [S$^{-1}$]·[R], or the transfer functions [h]. As noted above, transfer functions [h] is the product of the inverse source vibration matrix [S$^{-1}$], from measurements by sensors 5 from vibrators V, with matrix [R] based on the recorded vibrations at geophones G, at each frequency $f_k$:

$$[h] = [S^{-1}] \cdot [R]$$

This product results in a matrix [h] of the transfer functions h, over frequency, for all four of the paths between vibrators $V_A$ through $V_D$ to geophone $G_1$ at frequency $f_k$, in this example. In effect, the records R are separated to provide traces, for each geophone, corresponding to individual ones of the vibrators V. Of course, as noted above, similar operations would be performed for each geophone G of interest in the survey.

Figure 9:
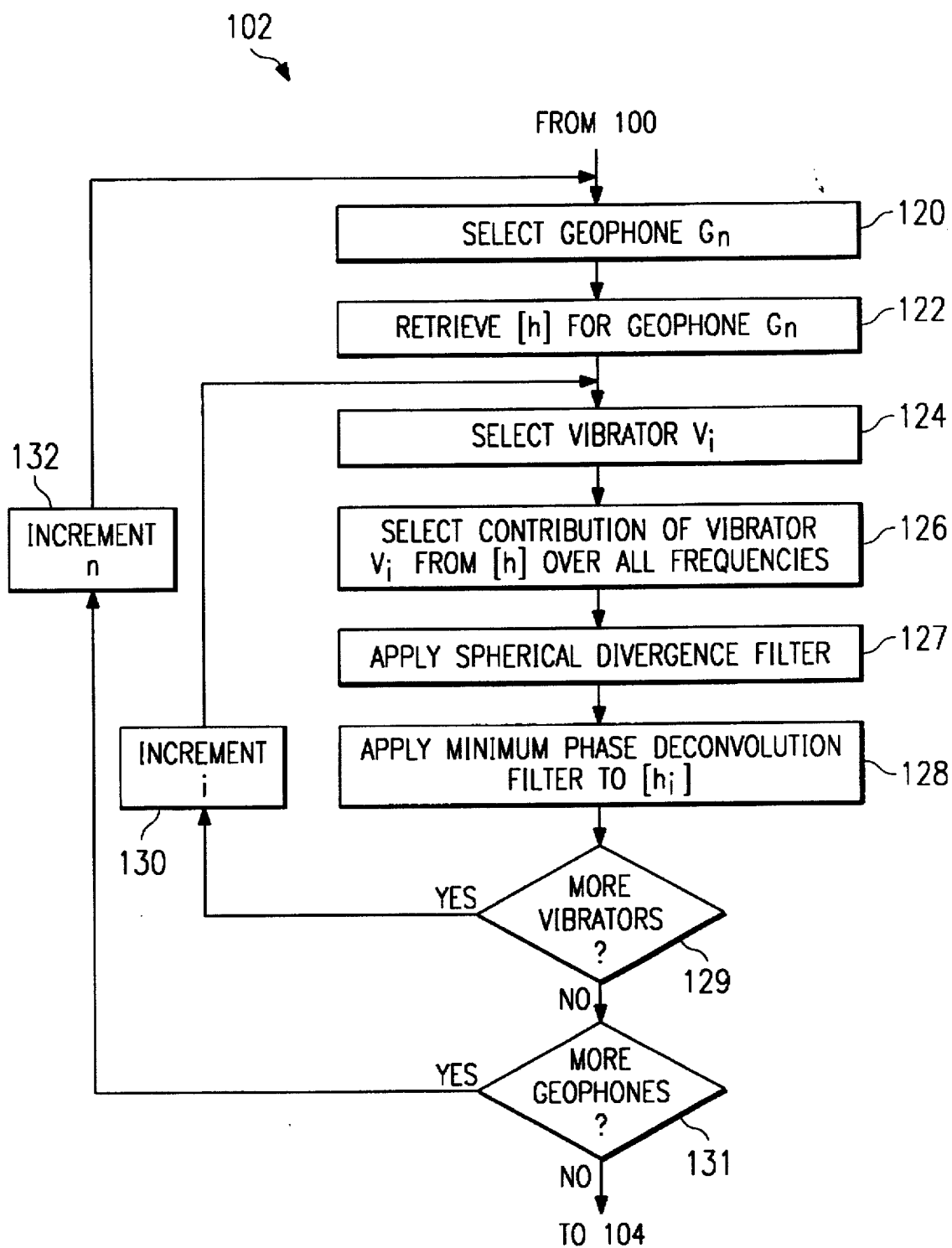
FIG. 9 is a detailed flow chart illustrating the inversion process used in the method according to the embodiment of the invention shown in FIG. 8.

Referring now to FIGS. 8 and 9, process 50″ performed by system computer 24 according to this alternative embodiment of the invention, where the reflectivity E is determined by the above-described matrix inversion of the set of separated transfer functions h for each geophone G, will now be described in detail. As shown in FIG. 8, process 50″ begins, in process 100, by retrieving, from memory, recorded data generated by system computer 24 (in process 40). As noted above, this data will include the matrices [h] of transfer functions for all four of the paths between vibrators $V_A$ through $V_D$ to geophone $G_1$, over all frequencies of interest; weighting factors generated according to the quality values QV for each path and each frequency may be incorporated into this retrieved data, so as to discount the contribution of poorly-behaved sweep frequencies.

Process 52 corresponds to a division, or inversion, process that is performed on the measured signals at geophones G. Process 52 represents a significant difference between the present invention and conventional processing. In conventional processing, the received data is correlated with the pilot signals, which are the ideal waveforms that are assumed to correspond to the vibrations actually imparted into the earth's surface; however, as noted above, distortion effects such as poor coupling, non-linearities, base plate flexure, and the like produce distortion from this ideal. In the present invention, as will now be described relative to FIG. 9, inversion process 102 eliminates certain assumptions which previously have been made regarding the vibrator force injected into the ground.

Referring now to FIG. 9, the operation of inversion process 102 according to this embodiment of the present invention will now be described in detail. Process 102 begins with process 120, in which the geophone $G_n$ of interest in a first pass of the process is identified; in process 122, the specific transfer function matrices [h] for geophone $G_n$, over frequency, are retrieved by system computer 24 from memory. Use of the previously determined separated transfer functions h corresponds to division of the recorded signals R at geophones G by the measured vibrations S at vibrators V, as described hereinabove, but where such division is performed after separation of the contributions of specific vibrators V to the composite records R. Process 124 indicates the specific vibrator $V_i$ for which this pass of the inversion is to be done, thus defining the specific path from vibrator $V_i$ to geophone $G_n$ of interest in this inversion.

Once the path is specified, process 126 selects the transfer function $h_i$ for the contribution of vibrator $V_i$ to the overall record matrix [D], for all frequencies of interest. Once the transfer functions $h_i$ over frequency are determined, a spherical divergence filter is applied, in process 127, to correct for attenuation of signal amplitude at later times within each trace (i.e., so that the signals correspond to a statistically stationary process). Process 128 then applies a minimum phase filter to the transfer functions $h_i$ over frequency (e.g., time-domain deconvolution with a minimum phase filter), thus removing the effect of the minimum phase function jω/T therefrom and isolating the earth reflectivity E for that path between vibrator $V_i$ and geophone $G_n$. This filtering may be done by way of frequency domain division, or by time domain deconvolution, depending upon the particular system computer 24 involved.

Decisions 129, 131 are then performed in a nested sequence along with index incrementing steps 130, 132, so that inversion and minimum phase filtering is done for each combination of vibrator $V_i$ and geophone $G_n$ in the survey. As a result, a reflectivity record E is provided for each of the paths of interest in the survey.

In process 104, a model trace is generated for each path of the survey. This model trace is basically a trace with a spike to record the phase and amplitude of the original data. This generated model trace will be used later to remove any phase errors that may have been introduced in the pre-processing process of the present invention.

In process 106, receiver deconvolution is performed upon the results of the division process from process 104. In the preferred embodiment, this receiver deconvolution is of a common receiver gather format. A Wiener-Levinson spiking ensemble deconvolution is used in the present invention, however, any deconvolution which uses a common receiver gather format to remove the effects due to variations between individual receivers may be used.

Process 108 performs receiver statics correction on the data from process 106. In the preferred embodiment a constant source location gather to remove receiver statics, (i.e. intra group statics). F-K filtering is then performed, in process 110, using a constant source location variable receiver gather is used to remove ground roll. In the preferred embodiment, the same gather for statics correction and for F-K filtering is used, constant source location. In process 112, shot deconvolution is performed on the data which has been static corrected. This deconvolution is also of the Wiener-Levinson spiking ensemble deconvolution type. However, as with the receiver deconvolution performed previously, any deconvolution that is of a common shot gather type to remove shot noise is acceptable. Process 114 then performs zero phase spiking deconvolution on the data which has been subjected to the receiver and shot deconvolutions and the statics correction. This deconvolution is a spectral whitening deconvolution to reduce monochromatic noise. This ensemble spiking deconvolution will be adequate to filter out the high-frequency and short time duration of minimum phase earth and impedance effects; these minimum phase effects include the dynamics of the corresponding vibrator V present between the monitoring point on vibrators V) and the earth surface, weathered layer effects, and certain reflection effects. The filtered transfer function is then applied to a spiking deconvolution process, such as is described in Robinson and Treitel, "Principles of Digital Filtering", *Geophysics*, Vol. XXIX, No. 3 (June, 1964), pp. 767–778, and Peacock and Treitel, "Predictive Deconvolution: Theory and Practice", *Geophysics*, Vol. XXXIV, No. 2 (April 1969), pp. 155–169, both reprinted in *The Robinson & reitel Reader* (SSC, 1969), corresponds to the production of a time-domain trace indicative of the two-way time of the vibratory energy along the particular path (i.e., the reflection sequence).

Model dephasing is then performed, in process 116, using the model trace generated at process 104 for each path to record the original phase and amplitude, to remove any phase errors that may have been introduced by the previous processing steps.

Thus, the method of the present invention for recording and pre-processing high resolution vibratory source data has been described which includes the steps of inversion with measured signals, receiver and shot ensemble deconvolution, statics correction, F-K filtering for noise, zero phase spiking deconvolution and model dephasing. As stated previously, an actual vibrator signal related to what the vibrator motion is measured to provide a signal that is used to process the data. The data is divided by the actual transmitted signal in the frequency domain. This process is then followed by the normal gather and stack processes (i.e., process 118 of FIG. 8) as conventionally performed on vibratory seismic surveys, resulting in a cross-sectional estimate of the location and depth of subsurface geological and strata.

According to any of its above-described alternative embodiments, the present invention provides the important capability of allowing, for each geophone in the survey region, the separation of earth response from individual ones of vibrators that are simultaneously energized in a vibratory survey. This improved separation is done in a way that permits multiple vibrators to be simultaneously energized, thus improving the overall efficiency of the survey operation. This improved separation takes into account non-linearities in the operation of the vibrators, imperfect coupling of the vibrator to the earth, non-repeatability of the vibrators, and other non-ideal behavior, thus improving the accuracy of the resulting survey and improving the resolution of the survey. Through use of the present invention, intermittent failure or noisy operation of one or more of the vibrators does not necessitate that a sweep be repeated. Other benefits and advantages of the present invention will be apparent to those of ordinary skill in the art having reference to this specification.

While the invention has been described herein relative to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A method of performing a vibratory seismic survey, comprising the steps of:

energizing a plurality of vibrators at the surface of the earth to vibrate the earth over a plurality of frequency sweeps, the number of the plurality of frequency sweeps being at least the number of the plurality of vibrators;

during the energizing step, measuring source vibrations at or near the plurality of vibrators;

storing a representation of the measured source vibrations in computer memory;

detecting field vibrations at a plurality of detecting locations at the surface of the earth, the detecting locations being spaced apart from the location of the plurality of vibrators;

storing a representation of the measured field vibrations in computer memory; and for each of a plurality of frequencies, determining an earth response transfer function for a path between each of the plurality of vibrators and each of the plurality of detecting locations based upon the stored representations of the measured source vibrations and measured field vibrations.

2. The method of claim 1, further comprising:

after the determining step, generating a seismic survey using the determined earth response transfer functions.

3. The method of claim 2, wherein the step of generating a seismic survey comprises:

for each pair of vibrator and detector locations, combining the earth response transfer functions with the representation of the measured source vibrations from that vibrator for each sweep;

cross-correlating the result of the combining step with a pilot signal used to drive the vibrator in each sweep; and for each pair of vibrator and detector locations, stacking the results of the cross-correlating step from all sweeps.

4. The method of claim 3, wherein the combining step is performed using frequency domain representations of the earth response transfer functions and measured source vibrations.

5. The method of claim 3, wherein the combining step is performed using time domain representations of the earth response transfer functions and measured source vibrations.

6. The method of claim 1, wherein the step of determining the earth response transfer functions comprises:

retrieving, from computer memory, the stored representations of the measured source vibrations and measured field vibrations;

operating a computer to transform the stored representations of the measured source vibrations and measured field vibrations into frequency domain representations; and operating the computer to perform, for each pair of one of the plurality of vibrators and one of the plurality of detecting locations, the steps comprising:

defining a first matrix of the frequency domain representation of the measured source vibrations at a frequency, and a second matrix of the frequency domain representation of the detected vibrations at the frequency;

determining an inverse of the first matrix;

multiplying the second matrix by the inverse of the first matrix to derive the earth response transfer functions at the frequency; and repeating the defining, determining, and multiplying steps for a plurality of frequencies.

7. The method of claim 6, wherein the multiplying step multiplies the second matrix by the generalized inverse of the first matrix to derive the earth response transfer functions at the frequency.

8. The method of claim 6, further comprising:

for each pair of one of the plurality of vibrators and one of the plurality of detecting locations, at each of the plurality of frequencies:

determining the eigenvalues of the first matrix; and determining a weighting factor corresponding to the eigenvalues from the determining step.

9. The method of claim 8, wherein the weighting factor corresponds to a ratio of a maximum one of the eigenvalues to a minimum one of the eigenvalues from the determining step.

10. The method of claim 6, wherein the energizing step comprises:

energizing the plurality of vibrators over a plurality of frequency sweeps that equals the number of the plurality of vibrators;

and wherein the step of determining an inverse of the first matrix determines the multiplicative inverse of the first matrix.

11. The method of claim 6, wherein the energizing step comprises:

energizing the plurality of vibrators over a plurality of frequency sweeps that is greater than the number of the plurality of vibrators;

and wherein the step of determining an inverse of the first matrix determines the generalized inverse of the first matrix.

12. The method of claim 1, wherein the energizing step comprises:

simultaneously energizing each of the plurality of vibrators in a first phase relationship for a first frequency sweep; and simultaneously energizing each of the plurality of vibrators in a second phase relationship, different from the first phase relationship, for a second frequency sweep.

13. The method of claim 1, wherein a selected one of the plurality of vibrators is not energized during each of the plurality of sweeps.

14. A method of generating a seismic survey based upon previously obtained vibratory seismic measurements including measurements of source vibrations from at or near vibrators located at the surface of the earth that are simultaneously energized over a plurality of sweeps, and measurements of detected vibrations from detector locations spaced away from the vibrators, the previously obtained vibratory seismic measurements being stored in digital form in a computer memory, comprising:

determining earth response transfer functions for each seismic path between one of the plurality of vibrators and one of the plurality of detecting locations, by operating a computer to perform the steps of:

retrieving, from computer memory, the stored representations of the measured source vibrations and measured field vibrations;

transforming the stored representations of the measured source vibrations and measured field vibrations into frequency domain representations;

defining a first matrix of the frequency domain representation of the measured source vibrations at a frequency, and a second matrix of the frequency domain representation of the detected vibrations at the frequency;

determining an inverse of the first matrix;

multiplying the second matrix by the inverse of the first matrix to derive the earth response transfer functions at the frequency; and repeating the defining, determining, and multiplying steps for a plurality of frequencies; and generating a seismic survey using the derived earth response transfer functions over a plurality of frequencies.

15. The method of claim 14, wherein the multiplying step multiplies the second matrix by the generalized inverse of the first matrix to derive the earth response transfer functions at the frequency.

16. The method of claim 14, further comprising:

for each pair of one of the plurality of vibrators and one of the plurality of detecting locations, at each of the plurality of frequencies:

determining the eigenvalues of the first matrix; and determining a weighting factor corresponding to the eigenvalues from the determining step.

17. The method of claim 16, wherein the weighting factor corresponds to a ratio of a maximum one of the eigenvalues to a minimum one of the eigenvalues from the determining step.

18. The method of claim 14, wherein the number of the plurality of frequency sweeps equals the number of the plurality of vibrators;

and wherein the step of determining an inverse of the first matrix determines the multiplicative inverse of the first matrix.

19. The method of claim 14, wherein the number of the plurality of frequency sweeps exceeds the number of the plurality of vibrators;

and wherein the step of determining an inverse of the first matrix determines the generalized inverse of the first matrix.

20. The method of claim 14, wherein the step of generating a seismic survey comprises:

for each pair of vibrator and detector locations, combining the derived earth response transfer functions with the representation of the measured source vibrations from that vibrator for each sweep;

cross-correlating the result of the combining step with a pilot signal used to drive the vibrator in each sweep; and for each pair of vibrator and detector locations, stacking the results of the cross-correlating step from all sweeps.

21. The method of claim 20, wherein the combining step is performed using frequency domain representations of the earth response transfer functions and measured source vibrations.

22. The method of claim 20, wherein the combining step is performed using time domain representations of the earth response transfer functions and measured source vibrations.

23. An apparatus for separating, from one another, the earth response to a plurality of sweeps of vibratory signals imparted from a plurality of vibrators simultaneously and received at a detecting location, comprising:

memory for storing representations of source vibrations as recorded at or near each of the plurality of vibrators;

memory for storing representations of vibrations detected at the detecting location;

a computer, coupled to the memories, and programmed in such a manner as to perform the steps of:

retrieving the stored representations of the measured source vibrations and measured field vibrations;

transforming the stored representations of the measured source vibrations and measured field vibrations into frequency domain representations;

defining a first matrix of the frequency domain representation of the measured source vibrations at a frequency, and a second matrix of the frequency domain representation of the detected vibrations at the frequency;

determining an inverse of the first matrix;

multiplying the inverse of the first matrix by the second matrix to derive the earth response transfer functions at the frequency; and repeating the defining, determining, and multiplying steps for a plurality of frequencies; and an output device, coupled to the computer, for display of seismic survey information based on the earth response transfer functions.

24. The apparatus of claim 23, wherein the multiplying step for which the computer is programmed multiplies the second matrix by the generalized inverse of the first matrix to derive the earth response transfer functions at the frequency.

25. The apparatus of claim 23, wherein the computer is also programmed to perform, at each of the plurality of frequencies, the steps of:

determining the eigenvalues of the inverse of the first matrix; and determining a weighting factor corresponding to the eigenvalues from the determining step.

26. The apparatus of claim 25, wherein the weighting factor corresponds to a ratio of a maximum one of the eigenvalues to a minimum one of the eigenvalues from the determining step.

27. The apparatus of claim 23, wherein the number of the plurality of frequency sweeps equals the number of the plurality of vibrators;

and wherein the step of determining an inverse of the first matrix determines the multiplicative inverse of the first matrix.

28. The apparatus of claim 23, wherein the number of the plurality of frequency sweeps in the energizing step exceeds the number of the plurality of vibrators;

and wherein the step of determining an inverse of the first matrix determines the generalized inverse of the first matrix.

* * * * *